United States Patent
Chen et al.

(10) Patent No.: US 10,152,630 B2
(45) Date of Patent: *Dec. 11, 2018

(54) METHODS AND SYSTEMS OF PERFORMING BLOB FILTERING IN VIDEO ANALYTICS

(71) Applicant: QUALCOMM Incorporated, San Diego, CA (US)

(72) Inventors: Ying Chen, San Diego, CA (US); Jianfeng Ren, San Diego, CA (US); Jian Wei, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/264,270

(22) Filed: Sep. 13, 2016

(65) Prior Publication Data

US 2018/0046858 A1    Feb. 15, 2018

Related U.S. Application Data

(60) Provisional application No. 62/372,657, filed on Aug. 9, 2016.

(51) Int. Cl.
*G06K 9/00* (2006.01)
*G06K 9/34* (2006.01)
(Continued)

(52) U.S. Cl.
CPC ..... *G06K 9/00577* (2013.01); *G06K 9/00771* (2013.01); *G06K 9/342* (2013.01);
(Continued)

(58) Field of Classification Search
None
See application file for complete search history.

(56) References Cited

U.S. PATENT DOCUMENTS 9,679,227 B2 *  6/2017  Taylor ................. G06K 9/6292
9,773,317 B2 *  9/2017  Lu ............................ G06T 7/194
(Continued)

FOREIGN PATENT DOCUMENTS

DE  102005053255 A1 *  5/2007  ............. A61B 6/032
EP        1566768 A2       8/2005
(Continued)

OTHER PUBLICATIONS

International Search Report and Written Opinion—PCT/US2017/034572—ISA/EPO—dated Aug. 3, 2017.

*Primary Examiner* — Sumati Lefkowitz
*Assistant Examiner* — Jiangeng Sun
(74) *Attorney, Agent, or Firm* — Polsinelli LLP

(57) ABSTRACT

Techniques and systems are provided for processing video data. For example, techniques and systems are provided for performing content-adaptive blob filtering. A number of blobs generated for a video frame is determined. A size of a first blob from the blobs is determined, the first blob including pixels of at least a portion of a first foreground object in the video frame. The first blob is filtered from the plurality of blobs when the size of the first blob is less than a size threshold. The size threshold is determined based on the number of the plurality of blobs generated for the video frame.

30 Claims, 12 Drawing Sheets

(51) Int. Cl.
*G06T 5/20* (2006.01)
*G06T 7/00* (2017.01)

(52) U.S. Cl.
CPC ............. *G06T 5/20* (2013.01); *G06T 7/0081* (2013.01); *G06T 2207/10016* (2013.01); *G06T 2207/20024* (2013.01); *G06T 2207/20144* (2013.01); *G06T 2207/20221* (2013.01); *G06T 2207/30232* (2013.01)

(56) References Cited

U.S. PATENT DOCUMENTS

| | | | |
|---|---|---|---|
| 2004/0076999 A1* | 4/2004 | Faeldt | G06T 7/0012 435/6.18 |
| 2006/0098858 A1* | 5/2006 | Guittet | G06K 9/00127 382/133 |
| 2007/0127774 A1* | 6/2007 | Zhang | G06K 9/00771 382/103 |
| 2014/0219560 A1 | 8/2014 | Robinson | |
| 2014/0348434 A1 | 11/2014 | Xu et al. | |
| 2015/0010128 A1 | 1/2015 | Drouin et al. | |
| 2015/0146915 A1 | 5/2015 | Peng et al. | |
| 2015/0268080 A1* | 9/2015 | Crouse | G01F 1/74 702/45 |
| 2015/0317797 A1* | 11/2015 | Lu | G06T 7/0081 382/103 |

FOREIGN PATENT DOCUMENTS

| | | |
|---|---|---|
| EP | 1760634 A2 | 3/2007 |
| KR | 20150136971 A | 12/2015 |
| WO | 2009067819 A1 | 6/2009 |
| WO | 2015148824 A1 | 10/2015 |

\* cited by examiner

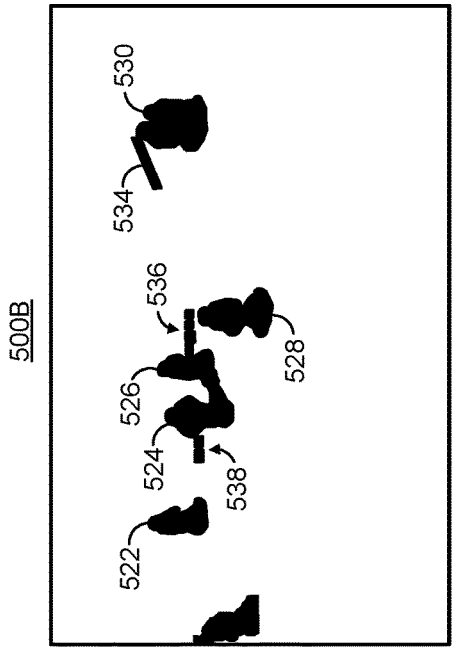
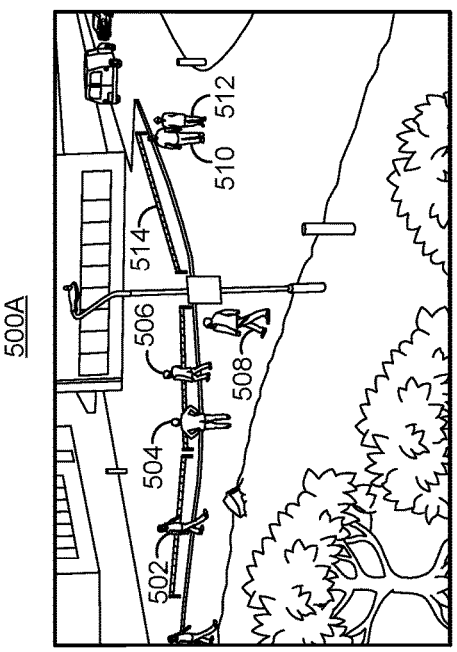
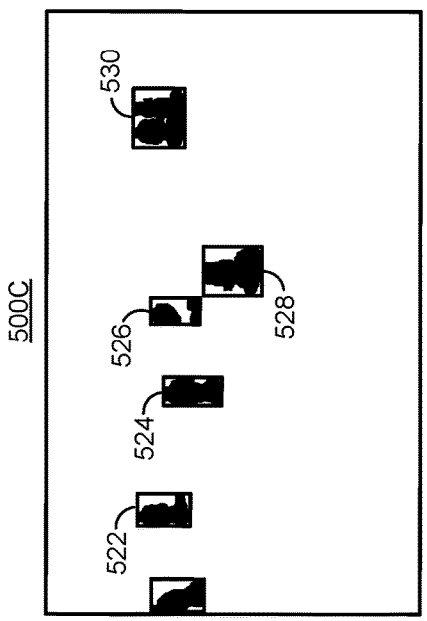

METHODS AND SYSTEMS OF PERFORMING BLOB FILTERING IN VIDEO ANALYTICS

CROSS-REFERENCE TO RELATED APPLICATIONS

This application claims the benefit of U.S. Provisional Application No. 62/372,657, filed Aug. 9, 2016, which is hereby incorporated by reference, in its entirety.

FIELD

The present disclosure generally relates to video analytics, and more specifically to techniques and systems performing blob filtering in video analytics.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for performing content-adaptive blob filtering. A blob represents at least a portion of one or more objects in a video frame (also referred to herein as a picture). In some examples, using video analytics, background subtraction is applied to a frame (or picture) and a foreground-background binary mask (referred to herein as a foreground mask or a foreground-background mask) is generated for the frame. Morphology operations can be applied to the foreground mask to reduce noise present in the foreground mask. Once morphology operations are applied, connected component analysis can be performed to generate connected components. After background subtraction and connected component analysis, blobs may be identified for the current frame based on the connected components. The content-adaptive blob filtering techniques and systems described herein can reduce and remove certain blobs generated for the one or more frames of the captured video. The blobs can then be provided, for example, for blob processing, object tracking, and other video analytics functions.

In some examples, the content-adaptive blob filtering can include a pre-filtering stage and a post-filtering stage for filtering the blobs. In some examples, blob merging can be performed between the pre-filtering and post-filtering stages to merge one or more of the blobs that remain after the pre-filtering stage. The pre-filtering stage can filter one or more blobs for a frame based on the sizes of the one or more blobs. When merging is used, two or more of the pre-filtered blobs can be merged together based on various characteristics of the blobs. The post-filtering stage can filter the remaining blobs (merged or unmerged) based on the sizes of the remaining blobs and also based on one or more dimensions (e.g., a height and/or a width) of the remaining blobs.

According to at least a first example of content-adaptive blob filtering, a method of filtering one or more blobs is provided that includes determining a number of a plurality of blobs generated for a video frame. The method further includes determining a size of a first blob. The first blob includes pixels of at least a portion of a first foreground object in the video frame. The method further includes filtering the first blob from the plurality of blobs when the size of the first blob is less than a size threshold. The size threshold is based on the number of the plurality of blobs generated for the video frame.

In another aspect of the first example of content-adaptive blob filtering, an apparatus is provided that includes a memory configured to store video data and a processor. The processor is configured to and can determine a number of a plurality of blobs generated for a video frame. The processor is configured to and can determine a size of a first blob. The first blob includes pixels of at least a portion of a first foreground object in the video frame. The processor is configured to and can filter the first blob from the plurality of blobs when the size of the first blob is less than a size threshold. The size threshold is based on the number of the plurality of blobs generated for the video frame.

In another aspect of the first example of content-adaptive blob filtering, a computer readable medium is provided having stored thereon instructions that when executed by a processor perform a method that includes: determining a number of a plurality of blobs generated for a video frame; determining a size of a first blob, wherein the first blob includes pixels of at least a portion of a first foreground object in the video frame; and filtering the first blob from the plurality of blobs when the size of the first blob is less than a size threshold, wherein the size threshold is based on the number of the plurality of blobs generated for the video frame.

In another aspect of the first example of content-adaptive blob filtering, an apparatus is provided that includes means for determining a number of a plurality of blobs generated for a video frame. The apparatus further comprises means for determining a size of a first blob. The first blob includes pixels of at least a portion of a first foreground object in the video frame. The apparatus further comprises means for filtering the first blob from the plurality of blobs when the size of the first blob is less than a size threshold. The size threshold is based on the number of the plurality of blobs generated for the video frame.

In some aspects, the methods, apparatuses, and computer readable medium described above further comprise: determining a height of a second blob, wherein the second blob includes pixels of at least a portion of a second foreground object in the video frame; and filtering the second blob from the plurality of blobs when the height of the second blob is less than a height threshold. In some examples, the height threshold includes a product of a minimum height threshold value and a height multiplier.

In some aspects, the minimum height threshold value is determined based on an aspect ratio of a minimum blob size corresponding to a minimum size threshold value.

In some aspects, the methods, apparatuses, and computer readable medium described above further comprise: determining a height and a width of a second blob, wherein the second blob includes pixels of at least a portion of a second foreground object in the video frame; determining the height of the second blob is greater than a height threshold; and filtering the second blob from the plurality of blobs when the width of the second blob is greater than a width threshold.

In some aspects, the height threshold includes a product of a minimum height threshold value and a height multiplier, and the width threshold includes a product of a maximum width threshold value and a width multiplier. In some aspects, the minimum height threshold value and the maximum width threshold value are determined based on an aspect ratio of a minimum blob size corresponding to a minimum size threshold value.

In some aspects, the methods, apparatuses, and computer readable medium described above further comprise: generating a merged blob, wherein the merged blob is generated by merging a second blob with a third blob; determining a height of the merged blob; and filtering the merged blob from the plurality of blobs when the height of the merged blob is less than a a height threshold. In some examples, the height threshold includes a product of a minimum height threshold and a height multiplier.

In some aspects, the methods, apparatuses, and computer readable medium described above further comprise: generating a merged blob, wherein the merged blob is generated by merging a second blob with a third blob; determining a height and a width of the merged blob; determining the height of the merged blob is greater than a height threshold; and filtering the merged blob from the plurality of blobs when the width of the merged blob is greater than a width threshold. In some examples, the height threshold includes a product of a minimum height threshold value and a height multiplier, and wherein the width threshold includes a product of a product of a maximum width threshold value and a width multiplier.

In some aspects, the size threshold includes a product of a minimum size threshold value and a blob multiplier. The blob multiplier is based on the number of the plurality of blobs generated for the video frame.

In some aspects, the minimum size threshold value defines a minimum blob size for the video frame.

According to at least a second example of content-adaptive blob filtering, a method of filtering one or more blobs is provided that includes determining a number of a plurality of blobs generated for a video frame. The method further includes determining a blob multiplier for the video frame. The blob multiplier is determined based on the number of the plurality of blobs generated for the video frame. The method further includes determining a size of a first blob. The first blob includes pixels of at least a portion of a first foreground object in the video frame. The method further includes determining the size of the first blob is less than a product of a minimum size threshold and the blob multiplier. The method further includes filtering the first blob from the plurality of blobs based on the size of the first blob being less than the product of the minimum size threshold and the blob multiplier.

In another aspect of the second example of content-adaptive blob filtering, an apparatus is provided that includes a memory configured to store video data and a processor. The processor is configured to and can determine a number of a plurality of blobs generated for a video frame. The processor is configured to and can determine a blob multiplier for the video frame. The blob multiplier is determined based on the number of the plurality of blobs generated for the video frame. The processor is configured to and can determine a size of a first blob. The first blob includes pixels of at least a portion of a first foreground object in the video frame. The processor is configured to and can determine the size of the first blob is less than a product of a minimum size threshold and the blob multiplier. The processor is configured to and can filter the first blob from the plurality of blobs based on the size of the first blob being less than the product of the minimum size threshold and the blob multiplier.

In another aspect of the second example of content-adaptive blob filtering, a computer readable medium is provided having stored thereon instructions that when executed by a processor perform a method that includes: determining a number of a plurality of blobs generated for a video frame; determining a blob multiplier for the video frame, wherein the blob multiplier is determined based on the number of the plurality of blobs generated for the video frame; determining a size of a first blob, wherein the first blob includes pixels of at least a portion of a first foreground object in the video frame; determining the size of the first blob is less than a product of a minimum size threshold and the blob multiplier; and filtering the first blob from the plurality of blobs based on the size of the first blob being less than the product of the minimum size threshold and the blob multiplier.

In another aspect of the second example of content-adaptive blob filtering, an apparatus is provided that includes means for determining a number of a plurality of blobs generated for a video frame. The apparatus further comprises means for determining a blob multiplier for the video frame. The blob multiplier is determined based on the number of the plurality of blobs generated for the video frame. The apparatus further comprises means for determining a size of a first blob. The first blob includes pixels of at least a portion of a first foreground object in the video frame. The apparatus further comprises means for determining the size of the first blob is less than a product of a minimum size threshold and the blob multiplier. The apparatus further comprises means for filtering the first blob from the plurality of blobs based on the size of the first blob being less than the product of the minimum size threshold and the blob multiplier.

In some aspects, the methods, apparatuses, and computer readable medium described above further comprise: determining a size of a second blob, wherein the second blob includes pixels of at least a portion of a second foreground object in the video frame; determining the size of the second blob is greater than the product of the minimum size threshold and the blob multiplier; determining the size of the second blob is less than a product of the minimum size threshold and a second blob multiplier, wherein the second blob multiplier is larger than the blob multiplier; and filtering the second blob from the plurality of blobs based on the size of the second blob being less than the product of the minimum size threshold and the second blob multiplier.

In some aspects, the methods, apparatuses, and computer readable medium described above further comprise: determining a size of a second blob, wherein the second blob includes pixels of at least a portion of a second foreground object in the video frame; determining the size of the second blob is greater than the product of the minimum size threshold and the blob multiplier; determining the size of the second blob is greater than a product of the minimum size threshold and a second blob multiplier, wherein the second blob multiplier is larger than the blob multiplier; determining a height of the second blob; determining the height of the second blob is less than a product of a minimum height threshold and a height multiplier; and filtering the second blob from the plurality of blobs based on the height of the second blob being less than the product of the minimum height threshold and the height multiplier.

In some aspects, the methods, apparatuses, and computer readable medium described above further comprise: determining a size of a second blob, wherein the second blob includes pixels of at least a portion of a second foreground object in the video frame; determining the size of the second blob is greater than the product of the minimum size threshold and the blob multiplier; determining the size of the second blob is greater than a product of the minimum size threshold and a second blob multiplier, wherein the second blob multiplier is larger than the blob multiplier; determining a height and a width of the second blob; determining the height of the second blob is greater than a product of a minimum height threshold and a height multiplier; determining the width of the second blob is greater than a product of a maximum width threshold and a width multiplier; and filtering the second blob from the plurality of blobs based on the width of the second blob being greater than the product of the maximum width threshold and the width multiplier.

In some aspects, the minimum height threshold and the maximum width threshold are determined based on an aspect ratio of a minimum blob size corresponding to the minimum size threshold.

In some aspects, the methods, apparatuses, and computer readable medium described above further comprise: determining a size of a second blob is greater than the product of the minimum size threshold and the blob multiplier, wherein the second blob includes pixels of at least a portion of a second foreground object in the video frame; generating a merged blob, the merged blob including the second blob merged with a third blob, wherein a size of the third blob is greater than the product of the minimum size threshold and the blob multiplier; determining the size of the merged blob is greater than a product of the minimum size threshold and a second blob multiplier, wherein the second blob multiplier is larger than the blob multiplier; determining a height and a width of the merged blob; determining the height of the merged blob is greater than a product of a minimum height threshold and a height multiplier; determining the width of the merged blob is greater than a product of a maximum width threshold and a width multiplier; and filtering the merged blob from the plurality of blobs based on the width of the merged blob being greater than the product of the maximum width threshold and the width multiplier.

In some aspects, any of the methods, apparatuses, and computer readable mediums described above can further comprise wherein the blob multiplier is assigned a value according to the number of blobs, the value including a minimum multiplier value, a maximum multiplier value, or a value between the minimum multiplier value and the maximum multiplier value.

In some aspects, any of the methods, apparatuses, and computer readable mediums described above can further comprise wherein the blob multiplier is assigned the minimum multiplier value when the number of blobs is below a minimum threshold number of blobs.

In some aspects, any of the methods, apparatuses, and computer readable mediums described above can further comprise wherein the blob multiplier is assigned the maximum multiplier value when the number of blobs is above a maximum threshold number of blobs.

In some aspects, any of the methods, apparatuses, and computer readable mediums described above can further comprise wherein the blob multiplier is assigned the value between the minimum multiplier value and the maximum multiplier value when the number of blobs is between a minimum threshold number of blobs and a maximum threshold number of blobs.

In some aspects, any of the methods, apparatuses, and computer readable mediums described above can further comprise wherein the minimum size threshold defines a minimum blob size for the video frame.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 5A is an illustration of a video frame (or picture) of an environment in which various objects are present.

FIG. 5B is an illustration of a foreground mask of the frame with noisy blobs.

FIG. 5C is an illustration of a foreground mask of the frame with blobs filtered using content-adaptive blob filtering.

DETAILED DESCRIPTION

Figure 1:
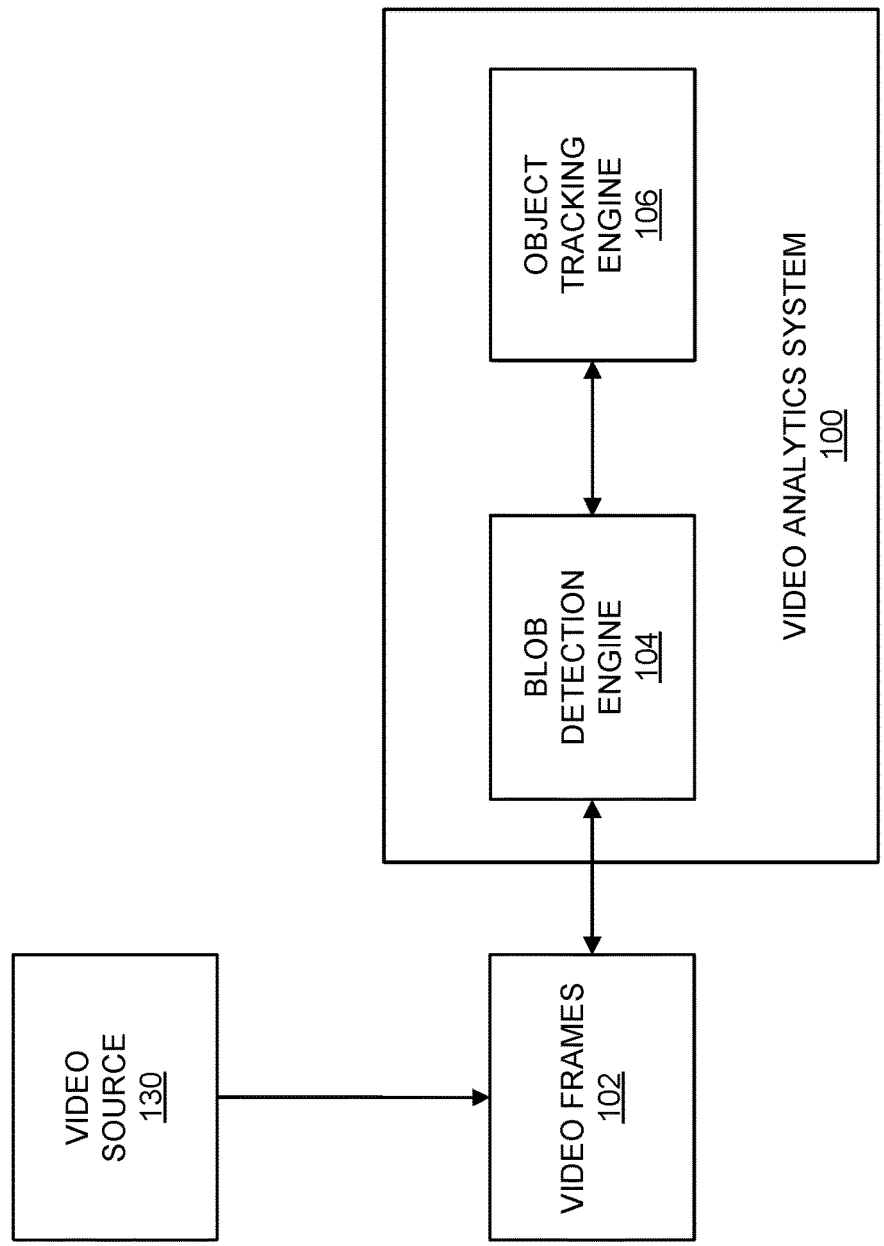
FIG. 1 is a block diagram illustrating an example of a system including a video source and a video analytics system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a video sequence from a video source and can process the video sequence to provide a variety of tasks. One example of a video source can include an Internet protocol camera (IP camera), or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of event of interest and sends an alert or alarm to a central control room to alert a user of the event of interest.

As noted previously, video analytics can generate and detect foreground blobs that can be used to perform various operations, such as object tracking or other operations described above. In some instances, noisy blobs can be generated by a video analytics system, which can significantly reduce blob detection and tracking rates. Systems and methods are described herein for providing content-adaptive blob filtering operations for video analytics.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection engine 104 and an object tracking engine 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection engine 104 can detect one or more blobs in video frames (e.g., video frames 102) of a video sequence, and the object tracking engine 106 can track the one or more blobs across the frames of the video sequence. As used herein, a blob refers to pixels of at least a portion of an object in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob. In some examples, a tracker can also be represented by a tracker bounding box. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box. In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below.

In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the two-dimensional center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the two-dimensional center position (x and y) of a bounding box of the tracker in a previous frame. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection engine 104 and the object tracking engine 106, the video analytics system 100 can perform blob generation and detection for each frame or picture of a video sequence. For example, the blob detection engine 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection engine 104 and the object tracking engine 106 are described with respect to FIGS. 3, 4, and 7-11.

Figure 2:
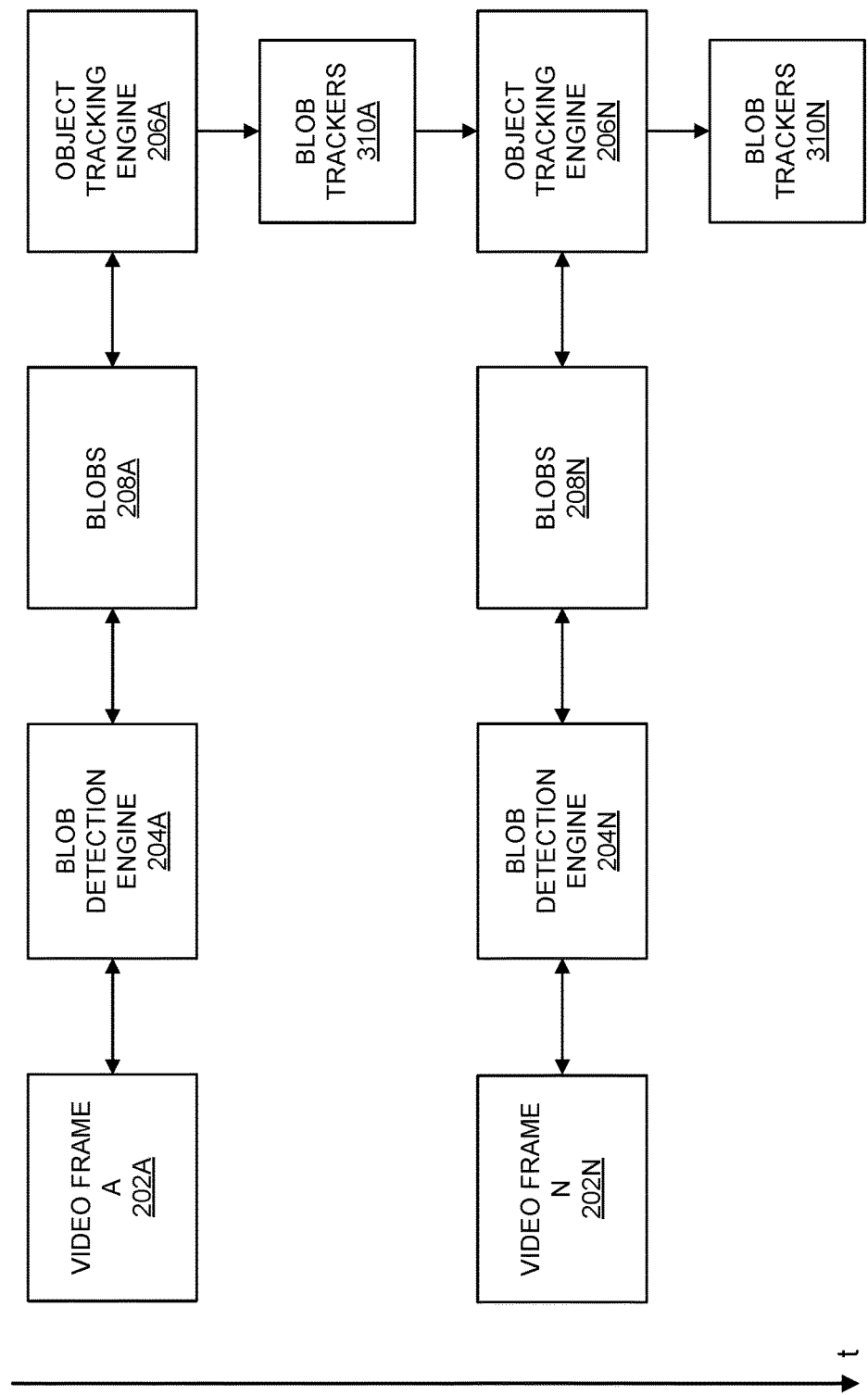
FIG. 2 is an example of a video analytics system processing video frames, in accordance with some embodiments.

FIG. 2 is an example of the video analytics system (e.g., video analytics system 100) processing video frames across time t. As shown in FIG. 2, a video frame A 202A is received by a blob detection engine 204A. The blob detection engine 204A generates foreground blobs 208A for the current frame A 202A. After blob detection is performed, the foreground blobs 208A can be used for temporal tracking by the object tracking engine 206A. Costs (e.g., a cost including a distance, a weighted distance, or other cost) between blob trackers and blobs can be calculated by the object tracking engine 206A. The object tracking engine 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers, including in terms of positions of the trackers, can be updated according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection engine 204N generates foreground blobs 208N for the frame N 202N. The object tracking engine 206N can then perform temporal tracking of the blobs 208N. For example, the object tracking engine 206N obtains the blob trackers 310A that were updated based on the prior video frame A 202A. The object tracking engine 206N can then calculate a cost and can associate the blob trackers 310A and the blobs 208N using the newly calculated cost. The blob trackers 310A can be updated according to the data association to generate updated blob trackers 310N.

Figure 3:
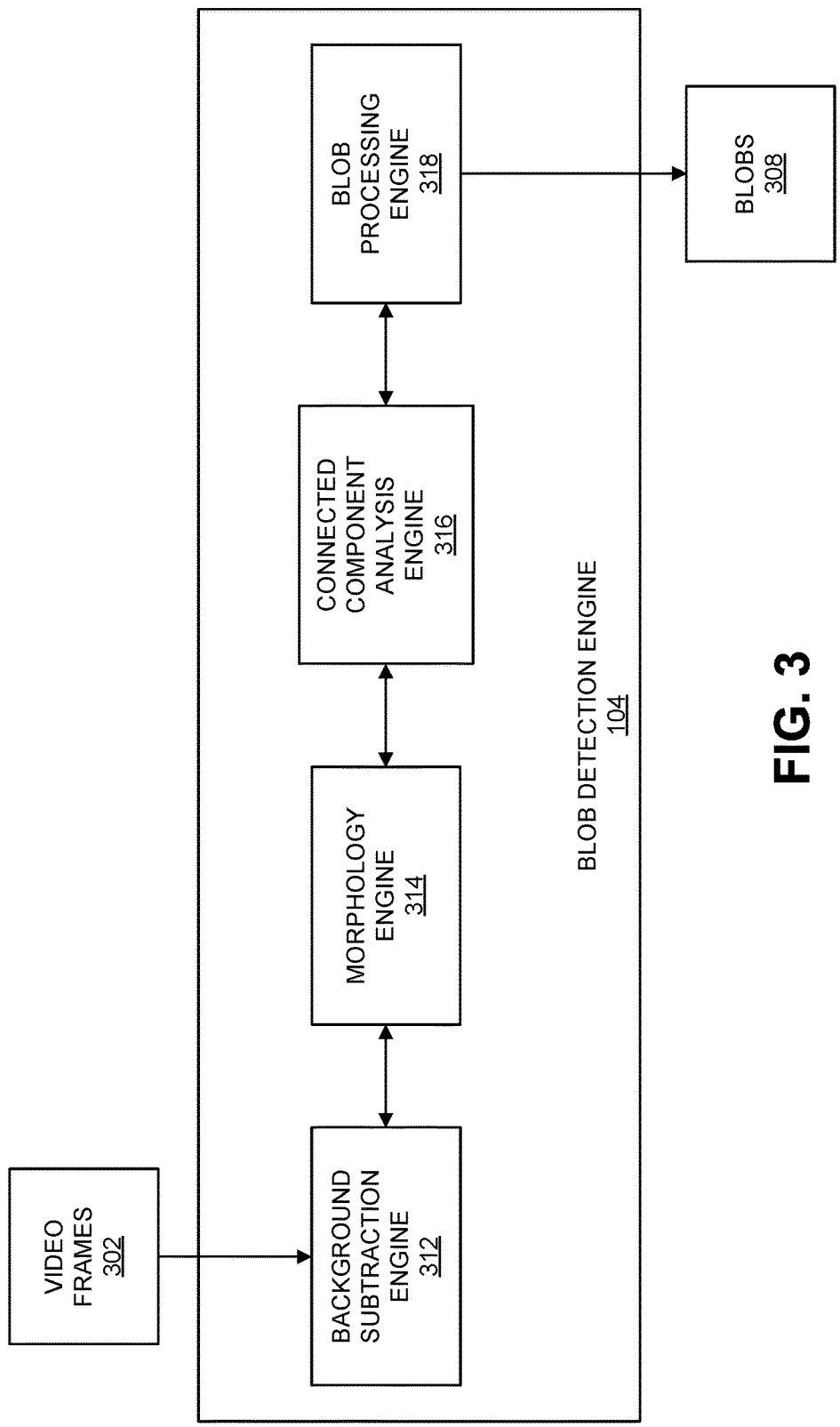
FIG. 3 is a block diagram illustrating an example of a blob detection engine, in accordance with some embodiments.

FIG. 3 is a block diagram illustrating an example of a blob detection engine 104. Blob detection is used to segment moving objects from the global background in a scene. The blob detection engine 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (GMM). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t | \mu_{i,t}, \Sigma_{i,t})$$ Equation (1)

An equation of the GMM model is shown in equation (1), wherein there are K Gaussian models. Each Guassian model has a distribution with a mean of $\mu$ and variance of $\Sigma$, and has a weight $\omega$. Here, i is the index to the Gaussian model and t is the time instance. As shown by the equation, the parameters of the GMM changes over time after one frame (at time t) is processed.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. Examples of foreground masks are shown in FIG. 5B, FIG. 5C, FIG. 6B, and FIG. 6C. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black (as shown in FIG. 5B, FIG. 5C, FIG. 6B, and FIG. 6C).

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. One example of the connected component analysis performed by the connected component analysis engine 316 is implemented as follows:

for each pixel of the foreground mask {
  if it is a foreground pixel and has not been processed, the following steps apply:
    Apply FloodFill function to connect this pixel to other foreground and generate a connected component Insert the connected component in a list of connected component.

Mark the pixels in the connected component as being processed

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection engine 104. In some examples, the blob processing engine 318 can perform content-based filtering of certain blobs. For instance, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some examples, the blob processing engine 318 can merge close blobs into one big blob to remove the risk of having too many small blobs that could belong to one object. In some examples, the blob processing engine 318 can filter out one or more small blobs that are below a certain size threshold (e.g., an area of a bounding box surrounding a blob is below an area threshold). In some embodiments, the blob detection engine 104 does not include the blob processing engine 318, or does not use the blob processing engine 318 in some instances. For example, the blobs generated by the connected component analysis engine 316, without further processing, can be input to the object tracking engine 106 to perform blob and/or object tracking.

Figure 4:
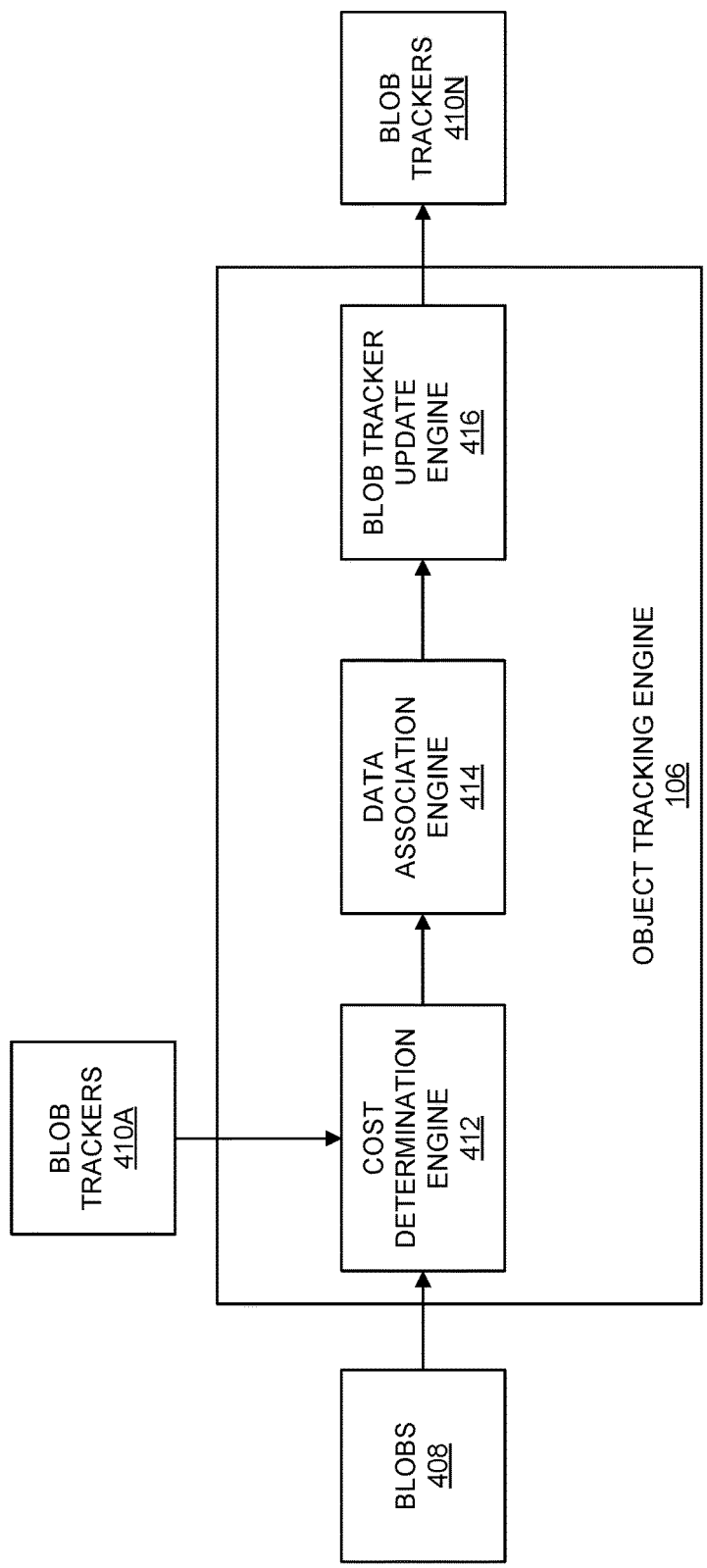
FIG. 4 is a block diagram illustrating an example of an object tracking engine, in accordance with some embodiments.

FIG. 4 is a block diagram illustrating an example of an object tracking engine 106. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking engine 106 can obtain the blobs 408 of a current video frame from the blob detection engine 104. The cost determination engine 412 can also obtain the blob trackers 410A updated from the previous video frame (e.g., video frame A 202A). A cost function can then be used to calculate costs between the object trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cost_{tb} = \sqrt{(t_x - b_x)^2 + (t_y - b_y)^2}$$

The terms $(t_x, t_y)$ and $(b_x, b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker with a corresponding blob and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible.

Regardless of the association technique that is used, the data association engine 414 can rely on the distance between the blobs and trackers. The location of the foreground blobs are identified with the blob detection engine 104. However, a blob tracker location in a current frame may need to be predicated from a previous frame (e.g., using a location of a blob associated with the blob tracker in the previous frame). The calculated distance between the identified blobs and estimated trackers are used for data association. After the data association for the current frame, the tracker location in the current frame can be identified with its associated blob(s)' location in the current frame. The tracker's location can be further used to update the tracker's motion model and predict its location in the next frame.

Once the association between the blob trackers 410A and blobs 408 has been completed, the blob tracker update engine 416 can use the information of the associated blobs, as well as the trackers' temporal statuses, to update the states of the trackers 410A for the current frame. Upon updating the trackers 410A, the blob tracker update engine 416 can perform object tracking using the updated trackers 410N, and can also provide the update trackers 410N for use for a next frame.

The state of a blob tracker can includes the tracker's identified location (or actual location) in a current frame and its predicted location in the next frame. The state can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., 2 or more), or other suitable tracker states.

One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Other than the location of a tracker, there may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other object of interest) intersect, the two trackers associated with the two objects will be merged together for certain frames, and the merge or occlusion status needs to be recorded for high level video analytics.

Regardless of the tracking method being used, a new tracker starts to be associated with a blob in one frame and, moving forward, the new tracker may be connected with possibly moving blobs across multiple frames. When a tracker has been continuously associated with blobs and a duration has passed, the tracker may be promoted to be a normal tracker and output as an identified tracker-blob pair. A tracker-blob pair is output at the system level as an event (e.g., presented as a tracked object on a display, output as an alert, or other suitable event) when the tracker is promoted to be a normal tracker. A tracker that is not promoted as a normal tracker can be removed (or killed), after which the tracker can be considered as dead.

As described above, the blob detection engine 104 can perform background subtraction to generate a foreground mask for a frame, and can perform morphology operations to reduce noise present in the foreground mask. Once morphology operations are applied, connected component analysis can be performed to generate connected components. After background subtraction and connected component analysis, blobs may be identified for the current frame. In some cases, results from such a process may be noisy, leading to the final blob detection having low accuracy. Blob processing can then be applied to further filter out some blobs and merge together some blobs, as well as to generate bounding boxes as input for blob/object tracking. For example, as described above, blob processing can include content based filtering of certain blobs (e.g., machine learning can identify that a current blob contains foliage, and can determine it as a noisy blob and remove it), merging close blobs into one big blob to remove the risk of having too many small blobs that could belong to one object, and filtering out small blobs below a threshold size.

Several problems are associated with blob analysis. For example, there may still be noisy blobs after blob analysis that are not suitable for blob/object tracking. Noise can include trees and other objects that appear to move, but that are part of the background. Although many noisy blobs are introduced by trees, the type of content that causes noise can include many other objects. An example is shown in FIG. 5A and FIG. 5B. FIG. 5A shows a video frame 500A (or picture) of an environment in which various objects are present, including person 502, person 504, person 506, person 508, person 510, person 512, and construction tape 514. FIG. 5B illustrates a foreground mask 500B of the frame 500A with blobs corresponding to foreground objects detected in the frame 500A. The detected blobs corresponding to foreground objects include blob 522 (corresponding to person 502), blob 524 (corresponding to person 504), blob 526 (corresponding to person 506), blob 528 (corresponding to person 508), and blob 530 (corresponding to person 510 and person 512). The foreground mask 500B also includes numerous noisy blobs caused by movement of the construction tape 514. The construction tape 514 is considered background since it does not change over time, but can occasionally move due to wind, a person moving the tape, or other factor causing the construction tape 514 to move. The occasional movement can cause the video analytics system to detect portions of the construction tape 514 as foreground blobs, including the blob 534, group of small blobs 536, and group of small blobs 538. Noisy blobs can significantly reduce the blob detection and tracking rates achieved by a video analytics system. As described in more detail below, FIG. 5C illustrates a foreground mask 500C of the frame 500A with blobs filtered using content-adaptive blob filtering operations.

Further, machine learning based methods that can identify certain noise may be very expensive when applied to each blob, and the number of blobs can be numerous. For example, the number of blobs generated for a frame can be as high as 100 or more. Using such an expensive process for a large number of blobs leads to inefficiencies and large cost.

Figure 6A:
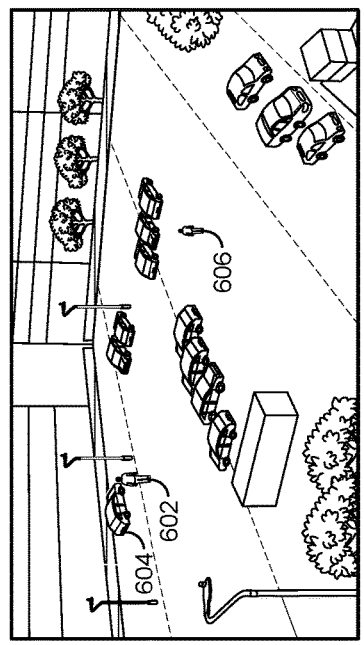
FIG. 6A is an illustration of a video frame of an environment in which various objects are present.
Figure 6B:
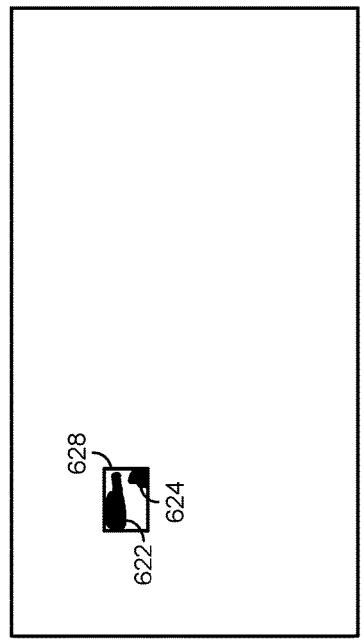
FIG. 6B is an illustration of a foreground mask of the picture with blobs.
Figure 6C:
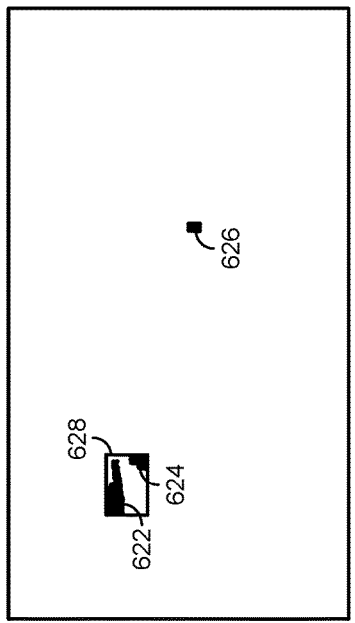
FIG. 6C is an illustration of a foreground mask of the frame with blobs filtered using content-adaptive blob filtering.

Even further, simply filtering blobs smaller than a threshold can remove some true positive blobs that are small, but that are not noise. For example, FIG. 6A is an illustration of a video frame 600A of an environment in which various objects are present, including person 602, car 604, and person 606. FIG. 6B illustrates a foreground mask 600B of the frame 600A with blobs corresponding to the foreground objects detected in the frame 600A. The detected blobs include only blob 622 (corresponding to person 602) and blob 624 (corresponding to car 604). The blobs 622 and 624 are surrounded by a bounding box 628. Setting the smallest size blob threshold to a certain value (e.g., 100, 200, 300, or any other suitable value) may lead to a significant loss of the blob detection in terms of the number of real objects detected. For example, there are three moving objects in the scene shown by frame 600A, including the car 604, the person 602, and the person 606. However, as shown in the foreground mask 600B, the person 606 is not detected as a blob because the blob is filtered out as being smaller than the threshold value. Such simple filtering methods can also keep noisy blobs that are relatively big (and thus meet the size-based threshold) in a foreground mask. As described in more detail below, FIG. 6C illustrates a foreground mask 600C of the frame 600A with blobs filtered using content-adaptive blob filtering operations.

Figure 7:
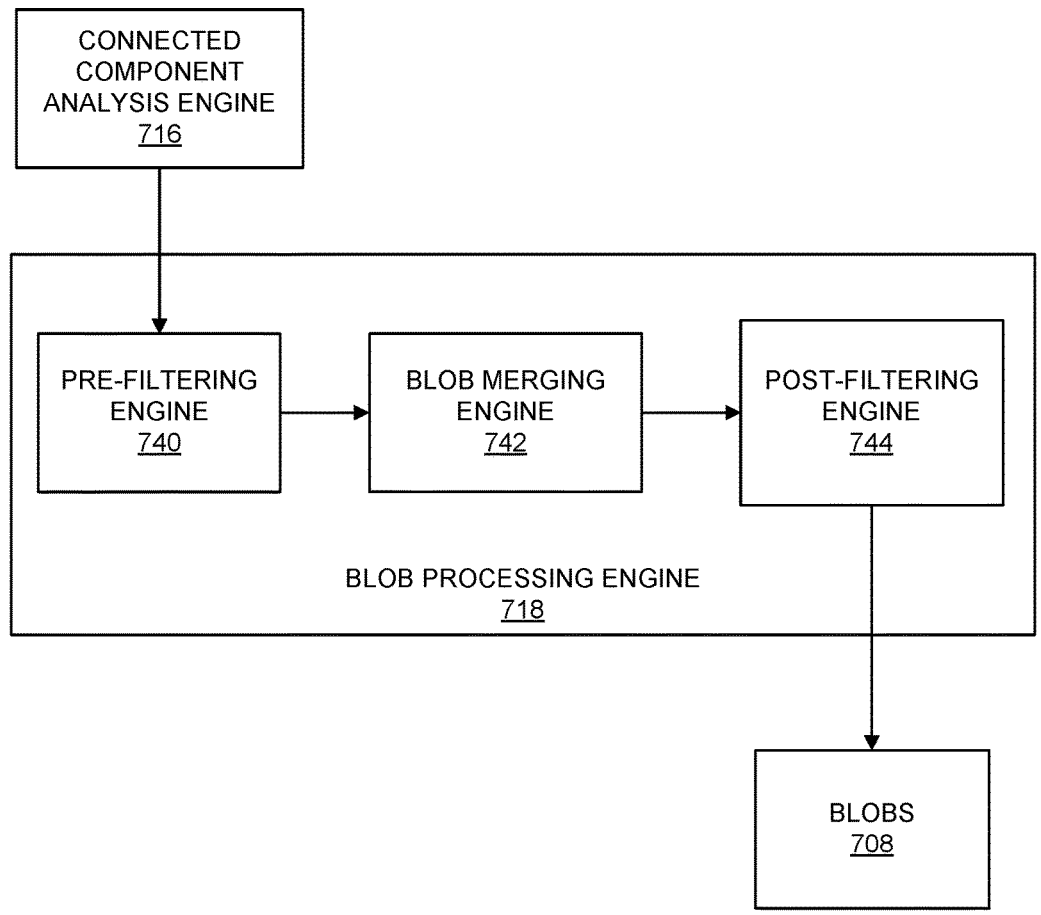
FIG. 7 is a block diagram illustrating an example of a blob processing engine that can perform content-adaptive blob filtering, in accordance with some embodiments.

Techniques and systems are described for performing content-adaptive blob filtering operations. FIG. 7 is a block diagram illustrating an example of a blob processing engine 718 that can implement content-adaptive blob filtering operations. The blob processing engine 718 includes a pre-filtering engine 740, a blob merging engine 742, and a post-filtering engine 744. The blob processing engine 718 can perform content-adaptive filtering operations to reduce and remove noisy blobs generated for the one or more frames of captured video. The pre-filtering engine 740 and the post-filtering engine 744 can be provided for filtering the blobs. In some implementations, blob merging can be performed by the blob merging engine 742 between the pre-filtering and post-filtering stages to merge one or more of the blobs remaining after the pre-filtering stage. The content-adaptive blob filtering operations filters blobs based on size, height, and width of the blobs, with the pre-filtering engine 740 filtering the blobs based on size and the post-filtering engine 744 filtering the remaining blobs based on size, height, and width.

The pre-filtering engine 740 receives the blobs from the connected component analysis engine 716. The connected component analysis engine 716 is similar to and can perform similar operations as the component analysis engine 316 described above with respect to FIG. 3. As described in more detail below, the pre-filtering engine 740 can filter one or more blobs from the blobs generated for a frame by the connected component analysis engine 716 based on the size of the one or more blobs. The blob merging engine 742 is optional. For example, in some implementations, the blob processing engine 718 includes the blob merging engine 742. In some implementations, the blob processing engine 718 does not include a blob merging engine, in which case blob merging is not performed between the pre-filtering and post-filtering stages. When blob merging is used, two or more of the pre-filtered blobs received from the pre-filtering engine 740 can be merged together based on various characteristics of the blobs. The post-filtering engine 744 can then filter the remaining blobs (either merged or unmerged blobs) based on the size of the remaining blobs and also based on one or more dimensions (e.g., a height and/or a width) of the remaining blobs. After post-filtering, the remaining blobs 708 are provided for further processing or for object tracking.

Figure 8:
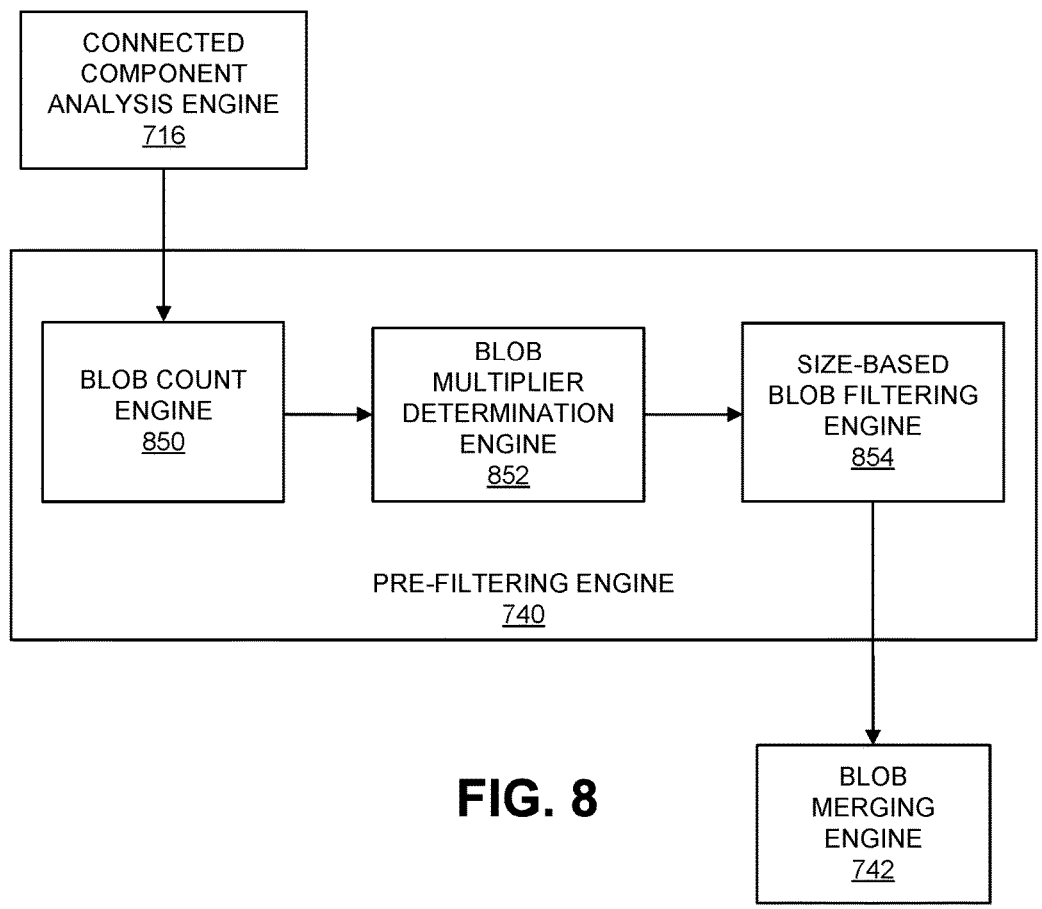
FIG. 8 is a block diagram illustrating an example of a pre-filtering engine of the blob processing engine, in accordance with some embodiments.

FIG. 8 is a block diagram of the pre-filtering engine 740 that performs the pre-filtering stage of the content-adaptive filtering operations. The pre-filtering stage includes size-based pre-filtering of the initial blobs that are generated by and received from the connected component analysis engine 716 for a current frame (a frame currently being analyzed by the blob processing engine 718). The pre-filtering engine 740 includes a blob count engine 850 that determines a number of blobs generated for each frame, a blob multiplier determination engine 852 that determines a blob multiplier for a frame based on the number of blobs in the frame, and a size-based blob filtering engine 854 that filters certain blobs based on the size of the blobs. For example, a current blob (a blob currently being analyzed by the blob processing engine 718) with a smaller size can be filtered out and discarded based on the size of the current blob as well as the number of blobs in the current frame.

The pre-filtering stage can be defined in a content-adaptive manner, and can depend on a size of a typical small object in a current scene or environment (in which frames of a video sequence are captured) and size threshold that is based on the number of blobs in a frame. For example, a blob multiplier may be determined based on the number of blobs in the frame. The size of a typical small object for a scene can be referred to as a minimum size threshold (tsSize). The minimum size threshold can be set to any suitable size that represents a minimum small object size for a given scene. The minimum size threshold can be taken as input into the video analytics system (e.g., a pre-determined input value) or automatically configured based on the scene or environment. In some examples, a given scene can be analyzed to determine a minimum blob size for actual foreground objects in the scene. Blobs generated for numerous frames capturing images of the scene can be analyzed to determine which blobs are noise (false positives) and which blobs are actual objects, and to determine a smallest object size out of the blobs representing actual objects. The smallest object size can be considered the minimum blob size for the scene. The minimum blob size can then be set to the minimum size threshold. In some examples, a minimum blob size can be configured for each frame. In one illustrative example, twenty blobs that correspond to actual foreground objects can be determined as being received from the connected component analysis engine 716. The smallest blob out of the twenty blobs can be detected, and the size of the smallest blob can be used as the minimum size threshold. In some examples, statistical analysis can be used to determine the minimum blob size. For example, a history of small blob sizes can be analyzed to determine an average small blob size.

A size of a blob can be defined using one or more techniques. In one example, the size of a blob can be defined as the size of its bounding box, in which case the blob size can be determined by calculating the area of the bounding box associated with the blob (e.g., a width of the bounding box multiplied by a height of the bounding box). In another example, the size of a blob can be defined as the number of foreground pixels in the blob, in which case the size of a blob can be determined by counting the number of pixels that make up the blob.

The pre-filtering stage can also depend on a blob multiplier (rT) that is used along with the minimum size threshold to determine whether to filter out a blob. The blob multiplier can act as a weight on the minimum size threshold, with the weight value depending on the number of blobs of a frame. For example, the blob multiplier is determined for a frame based on a number of blobs that are generated for the frame by the connected component analysis engine 716. The blob multiplier is set according to the number of blobs in the current frame, so that a more complex scene (with more blobs) will have more chances for blobs to be removed. The number of blobs generated for a frame can be compared to one or more multiplier threshold numbers of blobs (e.g., a minimum multiplier threshold and a maximum multiplier threshold) to determine a value for the blob multiplier for the frame. The blob multiplier can be set to any value within a range of blob multiplier values based on the comparison. The range can include any suitable range of values, such as a range of 0 to 1, a range of 0.05 to 1, a range of 0.05 to 0.5, a range of 0.05 to 0.25, a range of 0.1 to 0.25, or any other suitable range.

In some examples, if the number of the blobs generated for the frame is smaller than a minimum multiplier threshold (nLTMin) number of blobs, the blob multiplier is set to a minimum multiplier value (rTMin). For instance, the minimum multiplier value can be set to the low end of a range of values available for the blob multiplier, such as a value of 0.05, 0.1, or other suitable minimum value. The minimum multiplier threshold number of blobs can be set to any suitable value, such as 10 blobs, 20 blobs, 30 blobs, 50 blobs, 100 blobs, or any other suitable minimum number of blobs for a frame. In some examples, if the number of the blobs in the frame is larger than a maximum multiplier threshold (nLTMax) number of blobs, the blob multiplier is set to a maximum multiplier value (rTMax). For example, the maximum multiplier value can be set to the high end of a range of values available for the blob multiplier, such as a value of 0.25, 0.5, 1, or other suitable maximum value. The maximum multiplier threshold number of blobs can be set to any suitable value, such as 50 blobs, 60 blobs, 70 blobs, 80 blobs, 100 blobs, 200 blobs, or any other suitable minimum number of blobs for a frame.

In some examples, in the event the number of blobs generated for a frame is between the minimum multiplier threshold (nLTMin) and the maximum multiplier threshold (nLTMax), the blob multiplier for the frame is linearly mapped to a value between the minimum multiplier value (rTMin) and the maximum multiplier value (rTMax) according to the number of blobs. For example, as the number of blobs gets closer to the maximum multiplier threshold, the blob multiplier will be set to a value (within the range of values between rTMin and rTMax) that is closer to the maximum multiplier value in a linear manner. Similarly, as the number of blobs gets closer to the minimum multiplier threshold, the blob multiplier will be set to a value that is closer to the minimum multiplier value in a linear manner. In one illustrative example, the minimum multiplier threshold is 100 blobs, the maximum multiplier threshold is 200, the minimum multiplier value is 0.05, the maximum multiplier value is 0.25, and the number of blobs for a frame is 150 blobs. In this example, the blob multiplier can be set to 0.15, which is halfway between 0.05 and 0.25, due to the number of blobs being halfway between the minimum multiplier threshold and the maximum multiplier threshold. One of ordinary skill in the art will appreciate that a blob multiplier for a frame can be linearly mapped to other values in a similar manner, depending on the number of blobs in the frame.

Using the minimum size threshold and the blob multiplier determined for a current frame, the size-based blob filtering engine 854 can filter out (remove or discard) certain small blobs from the blobs that are associated with the current frame. For example, when a size of a current blob (currSize) is smaller than a size threshold, the current blob is filtered out. The size threshold can include a product of the minimum size threshold value (tsSize) multiplied by the blob multiplier (rT) for the frame (denoted as currSize<rT*tsSize).

Figure 9:
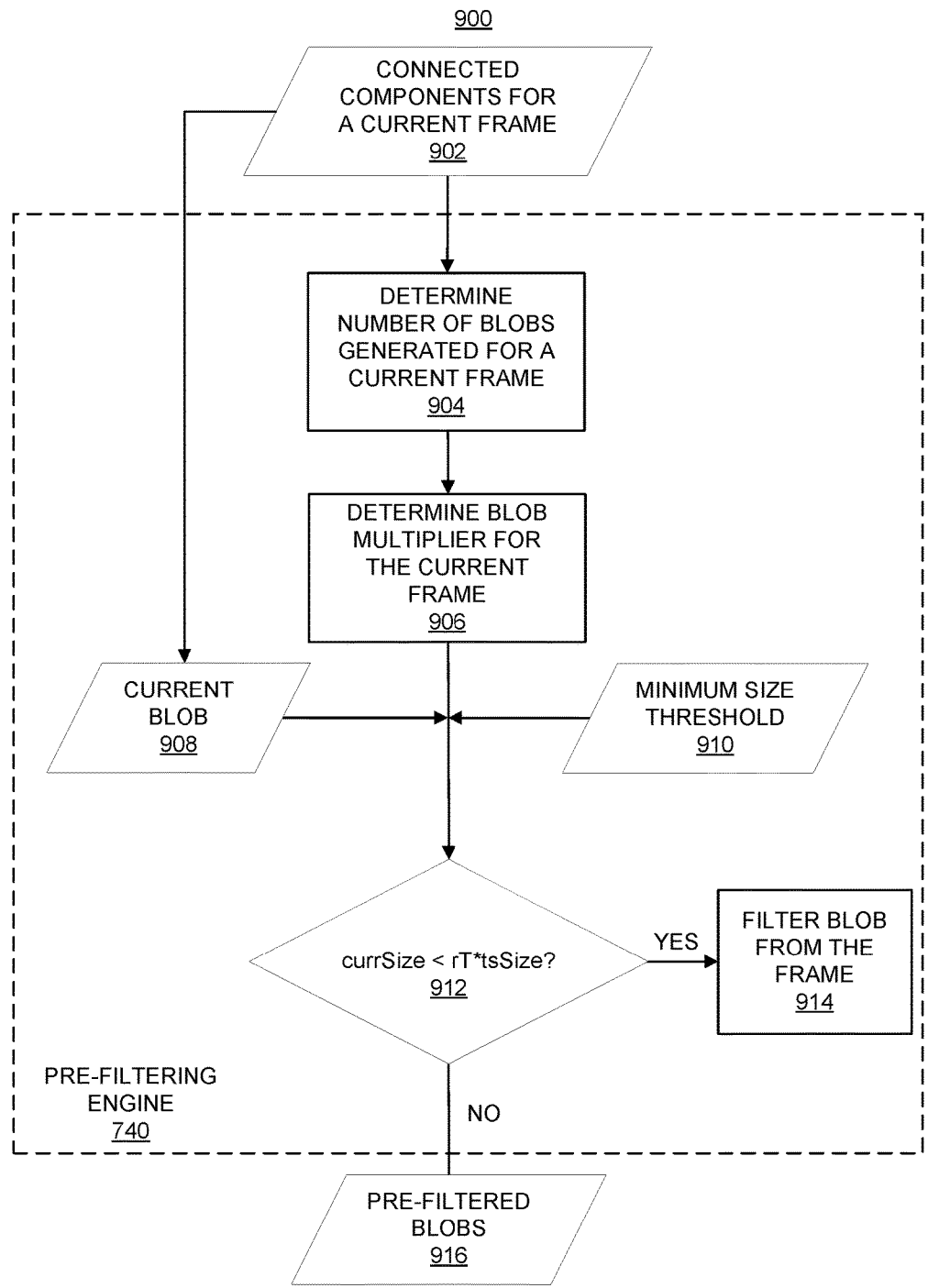
FIG. 9 is a flowchart illustrating an embodiment of a blob filtering process performed by the pre-filtering engine, in accordance with some embodiments.

FIG. 9 illustrates an embodiment of a process 900 of performing the pre-filtering operations described above. The process 900 can be performed by the pre-filtering engine 740. At 904, the process 900 includes determining a number of blobs generated for a current frame. For example, the connected components 902 for the current frame are received by the blob count engine 850.

In some examples, the blob count engine 850 can receive the number of connected components 902 for the current frame from the connected component analysis engine 716. As noted previously, each connected component received from the connected component analysis engine 716 defines a blob, in which case the number of connected components equals the number of blobs. In one illustrative example, during the connected component analysis process performed by the connected component analysis engine 716, a counter can be used to record the number of connected components that are generated (e.g., by counting the connected components as they are generated in real-time or near real-time). For instance, during the connected component analysis process, once a seed (the center pixel) is selected to grow to a connected component and it terminates, the counter is updated (incremented by one) by the connected component analysis engine 716. The value of the counter can then be output to the blob count engine 850, indicating the number of blobs.

In some examples, the blob count engine 850 can receive the connected components 902 from the connected component analysis engine 716, and can count the number of connected components 902. In one illustrative example, the connected component analysis engine 716 can output the determined connected components 902 for the current frame to the blob count engine 850. The blob count engine 850 can then determine the number of received connected components, which can be used as the number of blobs.

At 906, the process 900 includes determining a blob multiplier (rT) for the current frame. As described above, the blob multiplier can be set according to the number of blobs in the current frame, leading to more complex scenes with more blobs being more likely to have blobs filtered out, and less complex scenes being less likely to have blobs filtered out. For example, the number of blobs generated for a frame can be compared to a minimum multiplier threshold (nLTMin) and a maximum multiplier threshold (nLTMax), and the blob multiplier can be determined based on the comparison, as described above. For example, the blob multiplier can be set to a minimum multiplier value (rTMin), a maximum multiplier value (rTMax), or linearly mapped to a value between rTMin and rTMax. In one illustrative example, the blob multiplier (rT) is calculated as rT=clip (numBlob, nLTMin, nLTMax)*(rTMax−rTMin)+rTMin, where numBlob is the number of the blobs after connected component analysis (e.g., obtained or determined by the blob count engine 850), nTLMin and nTLMax are the minimum and maximum threshold numbers of blobs, respectively, and rTMin and rTMax are the minimum multiplier value and the maximum multiplier value, respectively. The clip function can be defined as Clip[x, min, max], which gives x for min≤x≤max, min for x<min, and max for x≥max.

A minimum size threshold (tsSize) 910 corresponding to a typical small blob size is determined, as described above, and can be applied to all blobs for the current frame. For example, tsSize can be an input size of the video analytics or can be calculated as described above (e.g., based on a particular scene, based on statistical analysis, or using other techniques). The blob multiplier (rT) can also be used for all blobs for the current frame. At 912, a size of a current blob 908 (currSize) is then compared with the size threshold. In one illustrative example, the size threshold can include a product of the minimum size threshold (tsSize) 910 multiplied by the blob multiplier (rT) to determine whether to filter out the current blob 908. For example, at 912, given the minimum size threshold (tsSize) 910 and the blob multiplier (rT), the process 900 calculates currSize<rT*tsSize. If the currSize of the current blob 908 is smaller than the size threshold (e.g., the product of the minimum size threshold (tsSize) 910 and the blob multiplier (rT)), the current blob 908 is filtered out at 914.

The process 900 can be repeated for each blob generated for the current frame. All blobs that are not filtered out at step 914 can be referred to as pre-filtered blobs 916. In implementations in which blobs are merged prior to the post-filtering stage, the pre-filtered blobs 916 can be provided to the blob merging engine 742. In implementations in which blobs are not merged, the pre-filtered blobs 916 can be provided to the post-filtering engine 744.

When merging is performed, two or more blobs of the pre-filtered blobs 916 can be merged together based on various characteristics of the blobs. For example, the blob merging engine 742 can merge some of the pre-filtered blobs if certain similar characteristics are observed between the blobs. The characteristics of blobs that can be compared can include location, direction of movement, speed of movement (e.g., the speed at which pixels of the blob move across frames), shapes, color, pixel intensity, or other suitable characteristics of blobs. Blobs with one or more characteristics that are similar can be merged together. For example, two blobs that are located within a certain distance from one another (e.g., measured from a centroid of the blobs, measured from bounding box edges of the two blobs, or the like), that are moving with a similar velocity, that are moving in a similar direction, that have similar color values, or that have a combination of such similar characteristics can be merged together into a single blob. After two or more of the pre-filtered blobs are merged, the remaining blobs may be bigger and may more reasonably represent the shapes of the objects. As noted previously, the merging stage is optional.

Figure 10:
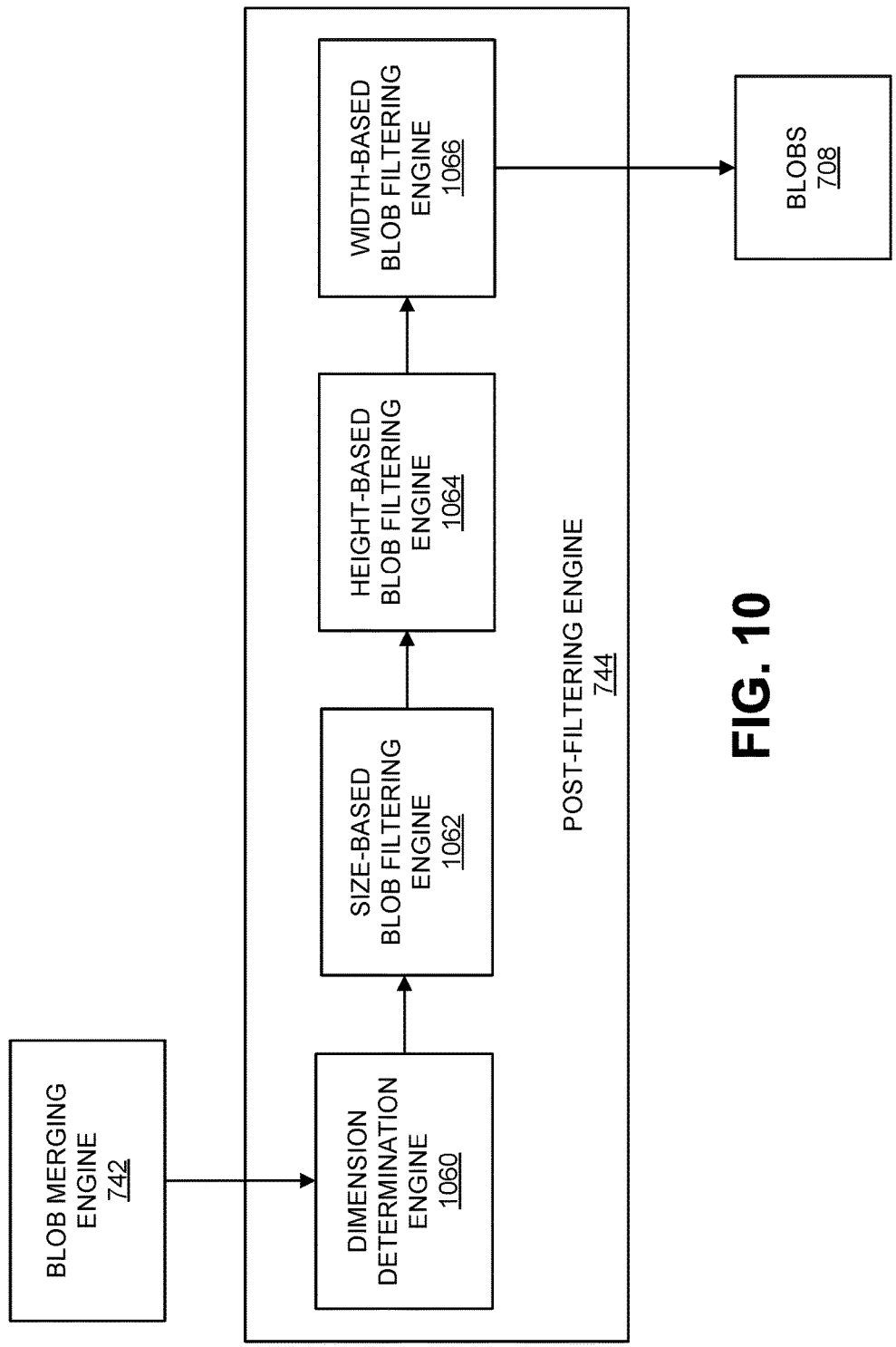
FIG. 10 is a block diagram illustrating an example of a post-filtering engine of the blob processing engine, in accordance with some embodiments.

The post-filtering stage can be applied using either the pre-filtered blobs or the merged pre-filtered blobs. FIG. 10 is a block diagram of the post-filtering engine 744 that performs the post-filtering stage of the content-adaptive filtering operations. The post-filtering engine 744 can apply content-adaptive post-filtering to further filter out blobs of a frame based on the size, height, and/or the width of the blobs (e.g., as defined by a bounding box of a blob). The post-filtering engine 744 includes a dimension determination engine 1060 that determines dimensions of each blob of the pre-filtered blobs (or merged blobs), a size-based filtering engine 1062 that filters certain blobs based on the size of the blobs, a height-based filtering engine 1064 that filters certain blobs based on the height of the blobs, and a width-based filtering engine 1066 that filters certain blobs based on the width of the blobs. In some cases, it can be assumed that a typical smaller object that is the most relevant for video analytics is a standing person with a certain range aspect ratio. With this assumption, a minimum size threshold, a minimum height threshold, and a maximum width threshold can be determined based on an observed typically small object.

The post-filtering stage can depend on the size of the typical small object (e.g., a standing person) in a current scene or environment. As noted above, the size of the typical small object is referred to as the minimum size threshold (tsSize), and can be determined as described above. The minimum size threshold (tsSize) can be the same size threshold as that used in the pre-filtering stage. The size-based blob filtering engine 1062 can filter out a current blob based on its size (currSize). For example, the current size (currSize) of the current blob can be compared with a second size threshold. In one illustrative example, the second size threshold includes a product of the minimum size threshold (tsSize) multiplied by a post-filtering blob multiplier Ts. Similar to the blob multiplier rT described above, the blob multiplier Ts acts as a weight on the minimum size threshold (tsSize). However, the blob multiplier Ts is larger than the blob multiplier rT used in the pre-filtering stage, since a current blob smaller than currSize*rT would have been filtered out during the pre-filtering stage. In some examples, the post-filtering blob multiplier Ts may be larger than the minimum multiplier value (rTMin) used in the pre-filtering stage, or may even be larger than the maximum multiplier value (rTMax). In one illustrative example, when the minimum multiplier value (rTMin) is 0.05 and the maximum multiplier value (rTMax) is 0.25, the post-filtering blob multiplier Ts can be set to 0.25. One of ordinary skill in the art will appreciate that the blob multiplier Ts can be set to any other suitable value larger than the minimum multiplier value (rTMin). If the size-based blob filtering engine 1062 determines the current size (currSize) of the current blob is smaller than the product of the minimum size threshold (tsSize) multiplied by the post-filtering blob multiplier Ts, the current blob is filtered out (removed from the blobs for the current frame). On the other hand, if the current size (currSize) is not smaller than the product of the minimum size threshold (tsSize) and the post-filtering blob multiplier Ts, the blob is not filtered out.

The blobs that remain after the size-based blob filtering engine 1062 can be analyzed by the height-based blob filtering engine 1064 and possibly by the width-based blob filtering engine 1066. A minimum height threshold (tsHeight) and a maximum width threshold (tsWidth) can be determined based on the minimum size threshold (tsSize), and can be used to further filter the blobs. For example, the minimum height threshold (tsHeight) and the maximum width threshold (tsWidth) can be determined by deriving an aspect ratio for a bounding box with a size equal to the minimum size threshold (tsSize). For instance, tsHeight can be the height of a bounding box of an object of size tsSize, and tsWidth can be the width of the bounding box of the object of size tsSize. In one illustrative example, the aspect ratio between width and height of a bounding box of an object of size tsSize can be assumed to be 3, with the width of the bounding box being 3 units (e.g., millimeters, centimeters, inches, or other unit) and the height of the bounding box being 1 unit (3:1 aspect ratio). In some examples of a scene of a parking lot (e.g., as shown by the frame 600A in FIG. 6), such an assumption of aspect ratio can be based on the observation that there are two typical objects in a scene, including cars and people, and that people are typically smaller than cars.

The height-based blob filtering engine 1064 can filter out a current blob based on a height of the current blob (currHeight). For example, the current height (currHeight) can be compared with a height threshold. In one illustrative example, the height threshold includes a product of the minimum height threshold (tsHeight) multiplied by a height multiplier (Th). The height multiplier can be set to a pre-determined value, such as 0.25, 0.5, 0.75, 1, or any other value that acts as a weight on the minimum height threshold. One of ordinary skill in the art will appreciate that the height multiplier Th can be set to any other suitable value. If the height-based blob filtering engine 1064 determines the current height (currHeight) of the current blob is smaller than the product of the minimum height threshold (tsHeight) multiplied by the height multiplier Th, the current blob is filtered out (removed from the blobs for the current frame). However, if the current height (currHeight) is not smaller than the product of the minimum height threshold (tsHeight) and the height multiplier Th, the blob is not filtered out.

The blobs remaining after the height-based blob filtering engine 1064 can be analyzed by the width-based blob filtering engine 1066. In some examples, the width-based blob filtering engine 1066 can filter out a current blob based on a width of the current blob (currWidth). In some examples, the width-based blob filtering engine 1066 can filter out a current blob based on the width of the current blob (currWidth), the height of the current blob (currHeight), and the size of the current blob (currSize). For example, when the size of the current blob (currSize) is smaller than a product of the minimum size threshold (tsSize) multiplied by a secondary blob multiplier TS, and the height of the current blob (currHeight) is smaller than a product of the minimum height threshold (tsHeight) multiplied by a secondary height threshold (TH), the width (currWidth) can be compared to a width threshold. In one illustrative example, the width threshold includes a product of the maximum width threshold (tsWidth) multiplied by a width multiplier (Tw). The width multiplier can be set to a pre-determined value, such as 1, 1.5, 2, 2.5, or any other value that acts as a weight on the maximum width threshold. If the width of the current blob (currWidth) is larger than the product of the maximum width threshold (tsWidth) and the width multiplier (Tw), the blob is filtered out. Hence, if the size of the current blob is relatively small (smaller than tsSize*TS), the height of the current blob is relatively small (smaller than tsHeight*TH), and width of the current blob is relatively big (bigger than tsWidth*Tw), the blob is removed.

As noted above, in some examples, a typical object of interest can be a person (e.g., in a standing position), in which case the width of the person should be below a certain threshold width (the tsWidth*Tw threshold). If the size of the current blob (currSize) is not smaller than the product of the minimum size threshold (tsSize) and the secondary blob multiplier TS, if the height of the current blob (currHeight) is not smaller than the product of the minimum height threshold (tsHeight) and the secondary height multiplier (TH), or if the width of the current blob (currWidth) is not larger than the product of the maximum width threshold (tsWidth) and the width multiplier (Tw), the blob is not removed and is kept for further processing.

The secondary blob multiplier (TS) and the secondary height multiplier (TH) are larger than the post-filtering blob multiplier (Ts) and height multiplier (Th), respectively, and are used to determine that the blob is relatively small, but not so small that the blob has already been filtered out after the size-based post-filtering and the height-based post-filtering. For example, when TS is set to 0.25, TH can be set to 0.5 and Tw can be set to 2. In such an example, the pre-filtering blob multiplier (rT) can be set to 0.1, the post-filtering blob multiplier (Ts) can be set to 0.2, and the height multiplier (Th) can be set to 0.4.

Figure 11:
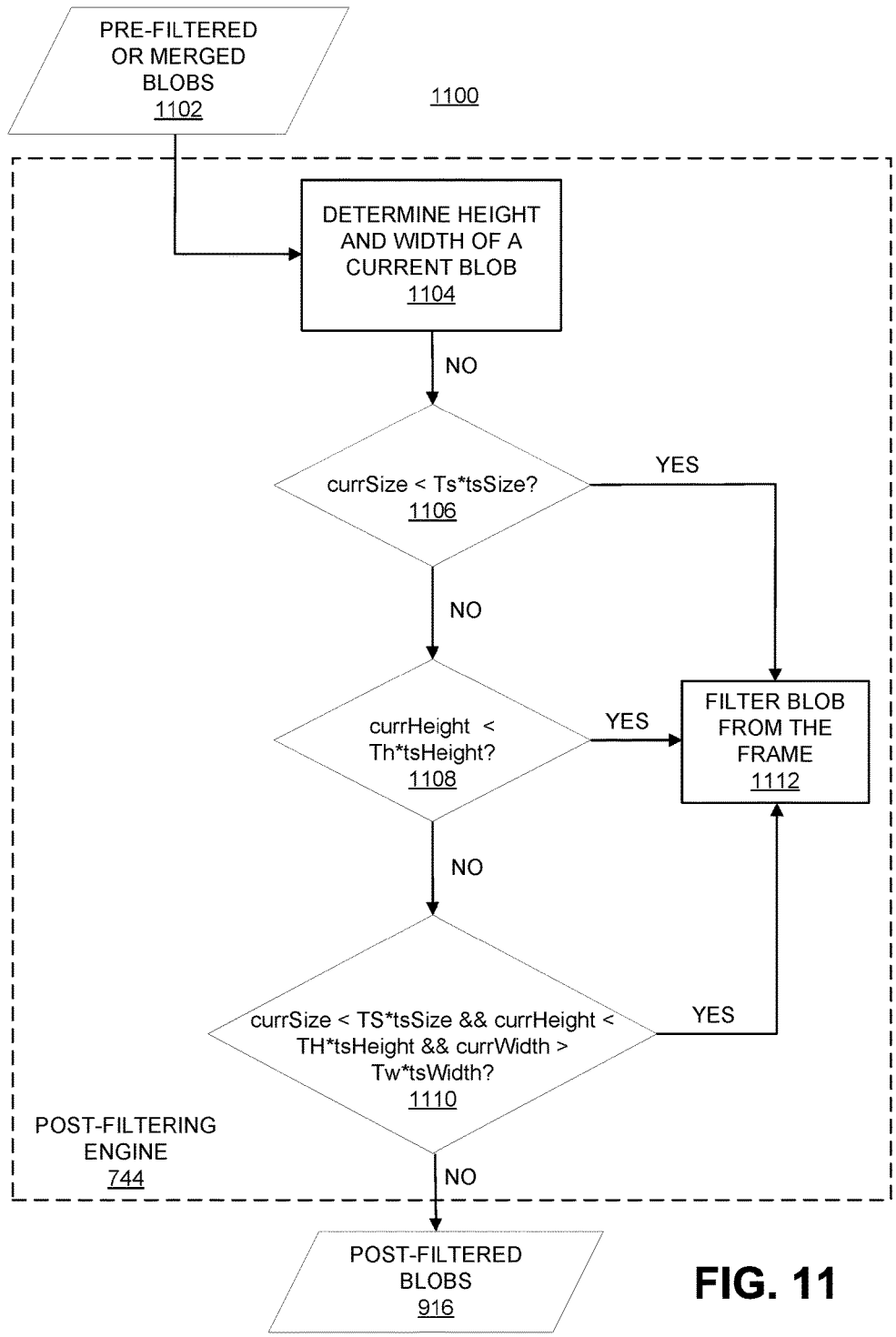
FIG. 11 is a flowchart illustrating an embodiment of a blob filtering process performed by the post-filtering engine, in accordance with some embodiments.

FIG. 11 illustrates an embodiment of a process 1100 of performing the post-filtering operations described above. The process 1100 can be performed by the post-filtering engine 744. At 1104, the process 1100 includes determining a height and a width of a current blob from a plurality of pre-filtered or merged blobs 1102 (depending on whether merging is performed between the pre-filtering and post-filtering stages). The height and width of the current blob can be derived from the height and width of the bounding box for the current blob.

At 1106, the current size (currSize) of the current blob is compared to the second size threshold. As previously described, the second size threshold can include a product of the minimum size threshold (tsSize) multiplied by the post-filtering blob multiplier (Ts). If currSize is smaller than tsSize*Ts, the current blob is filtered out at 1112. If not, at 1108, the current height (currHeight) of the current blob is compared to the height threshold. The height threshold can include a product of the minimum height threshold (tsHeight) multiplied by the height multiplier (Th). If currHeight is smaller than tsHeight*Th, the current blob is filtered out at 1112. If not, at 1110, the size of the current blob (currSize) is compared to a product of the minimum size threshold (tsSize) multiplied by the secondary blob multiplier TS, the height of the current blob (currHeight) is compared to a product of the minimum height threshold (tsHeight) multiplied by the secondary height threshold (TH), and the width (currWidth) is compared to the width threshold. The width threshold can include a product of the maximum width threshold (tsWidth) multiplied by a width multiplier (Tw). If currSize is smaller than the product of tsSize*TS, and currHeight is smaller than the product of tsHeight*TH, and currWidth is larger than the product of currWidth*Tw, the current blob is filtered out at 1112. Otherwise, if any of the conditions is not met (e.g., currSize is not smaller than the product of tsSize*TS, or currHeight is not smaller than the product of tsHeight*TH, or currWidth is not larger than the product of currWidth*Tw), the blob is not removed and is output as a post-filtered blob included in the post-filtered blobs 916.

By considering size, height, and width of blobs, a more intelligent filtering process can be performed to remove noisy blobs. Such noisy blobs significantly reduce blob detection and tracking rates achieved by a video analytics system. Small blobs that are not noise can be retained, while noisy blobs that are relatively big can be removed. As shown in FIG. 5C, a foreground mask 500C of the frame 500A does not include noisy blobs that are filtered using the content-adaptive blob filtering operations described herein. For example, the blob 534, group of blobs 536, and group of blobs 538 (that were not filtered using size-only filtering, as shown in FIG. 5B) are filtered out of the foreground mask 500C, and are thus removed from the blobs used for tracking and/or other video analytics functions. Further, as shown in FIG. 6C, the foreground mask 600C of the frame 600A preserves the small blob 626 that corresponds to an actual foreground object (person 606), which was filtered out of the foreground mask 600B using size-only filtering.

The results of a series of video clips are listed and compared in Table 1 below.

TABLE 1

Blob Tracking and Detection Rates Comparison

| Seq. ID | Size-Based Filtering | | Size and Dimension-Based Filtering | | DR Gain | TR Gain |
|---|---|---|---|---|---|---|
| | Detection Rate (DR) | Tracking Rate (TR) | DR | TR | | |
| 1 | 0.14 | 0.21 | 0.22 | 0.33 | 53.4% | 56.0% |
| 2 | 0.05 | −0.68 | 0.05 | −1.15 | −0.2% | 69.1% |
| 3 | 0.14 | 0.21 | 0.47 | 0.67 | 231.0% | 216.7% |
| 4 | 0.47 | 0.70 | 0.51 | 0.63 | 8.0% | −10.1% |
| 5 | 0.35 | 0.62 | 0.34 | 0.61 | −4.9% | −1.6% |
| 6 | 0.40 | 0.60 | 0.43 | 0.65 | 7.6% | 8.5% |
| 7 | 0.14 | 0.20 | 0.41 | 0.62 | 202.5% | 204.9% |
| 8 | 0.43 | 0.63 | 0.55 | 0.79 | 27.6% | 26.0% |
| 9 | 0.38 | 0.62 | 0.53 | 0.75 | 40.7% | 20.6% |
| 10 | 0.14 | 0.26 | 0.35 | 0.69 | 150.0% | 165.4% |
| Average | 0.26 | 0.34 | 0.39 | 0.46 | 46.0% | 36.0% |

The size-based anchor technique filters the blobs based on a fixed size (e.g., 300, which is close to a size of a 16×16 bounding box). The size and dimension-based filtering solution includes the content-adaptive filtering techniques described herein, which take into account the size, the height, and the width of a blob, as described above. As shown in Table 1, the blob detection rate and the tracking detection rate are significantly improved by performing the content-adaptive filtering. For example, the detection rate is improved by 46%, and the tracking rate is improved by 36%.

Figure 12:
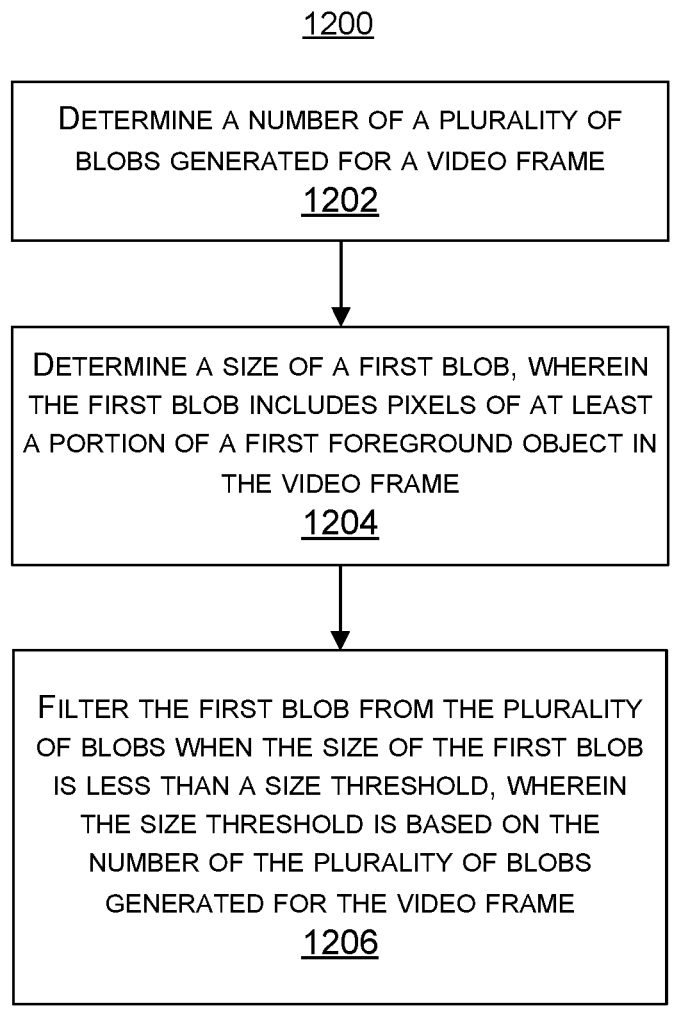
FIG. 12 is a flowchart illustrating an example of a process of performing content-adaptive blob filtering operations, in accordance with some embodiments.

FIG. 12 illustrates an example of a process 1200 of filtering one or more blobs using the filtering techniques described herein. At 1202, the process 1200 includes determining a number of a plurality of blobs generated for a video frame. For example, background subtraction can be performed to generate a foreground mask for the video frame, and connected component analysis can be performed to generate connected components. The blobs may be identified for the video frame based on the connected components. In some examples, morphology operations (e.g., one or more erosion and dilation functions) can be applied to the foreground mask prior to the connected component analysis to reduce noise present in the foreground mask.

At 1204, the process 1200 includes determining a size of a first blob, wherein the first blob includes pixels of at least a portion of a first foreground object in the video frame. As noted previously, a size of a blob can be defined using one or more techniques. In one example, the size of the first blob can be defined as the size of its bounding box. For instance, the blob size can be determined by calculating the area of the bounding box associated with the blob (e.g., a width of the bounding box multiplied by a height of the bounding box). In another example, the size of the first blob can be determined by counting the number of foreground pixels in the first blob.

At 1206, the process 1200 includes filtering the first blob from the plurality of blobs when the size of the first blob is less than a size threshold. The size threshold is based on the number of the plurality of blobs generated for the video frame. In some examples, the size threshold includes a product of a minimum size threshold value and a blob multiplier. The blob multiplier is based on the number of the plurality of blobs generated for the video frame. In one example, the blob multiplier can include the blob multiplier rT described above. The minimum size threshold value defines a minimum blob size for the video frame, and can be set or defined as described above. In one example, the minimum blob size can include the size threshold tsSize described above. For example, the process 1200 can include determining a blob multiplier for the video frame based on the number of the plurality of blobs generated for the video frame, determining the size of the first blob is less than the product of the minimum size threshold and the blob multiplier, and filtering the first blob from the plurality of blobs based on the size of the first blob being less than the product of the minimum size threshold and the blob multiplier.

In some examples, the blob multiplier is assigned a value according to the number of blobs. The value includes a minimum multiplier value, a maximum multiplier value, or a value between the minimum multiplier value and the maximum multiplier value. In some aspects, the blob multiplier is assigned the minimum multiplier value when the number of blobs is below a minimum threshold number of blobs. In one illustrative example, if the number of the blobs is smaller than a minimum multiplier threshold (nLTMin) number of blobs, the blob multiplier is set to a minimum multiplier value (rTMin), as described above. In some aspects, the blob multiplier is assigned the maximum multiplier value when the number of blobs is above a maximum threshold number of blobs. In one illustrative example, if the number of the blobs in the frame is larger than a maximum multiplier threshold (nLTMax) number of blobs, the blob multiplier is set to a maximum multiplier value (rTMax). In some aspects, the blob multiplier is assigned the value between the minimum multiplier value and the maximum multiplier value when the number of blobs is between a minimum threshold number of blobs and a maximum threshold number of blobs. In one illustrative example, if the number of blobs generated for a frame is between the minimum multiplier threshold (nLTMin) and the maximum multiplier threshold (nLTMax), the blob multiplier for the frame is mapped to a value between the minimum multiplier value (rTMin) and the maximum multiplier value (rTMax) according to the number of blobs. For instance, as the number of blobs gets closer to the maximum multiplier threshold, the blob multiplier will be set to a value (within the range of values between rTMin and rTMax) that is closer to the maximum multiplier value in a linear manner. Similarly, as the number of blobs gets closer to the minimum multiplier threshold, the blob multiplier will be set to a value that is closer to the minimum multiplier value (e.g., in a linear manner).

In some examples, the process 1200 includes determining a size of a second blob. The second blob includes pixels of at least a portion of a second foreground object in the video frame. In such examples, the process 1200 further includes determining the size of the second blob is greater than the product of the minimum size threshold and the blob multiplier, and determining the size of the second blob is less than a second size threshold. In some examples, the second size threshold includes a product of the minimum size threshold value and a second blob multiplier. The second blob multiplier is larger than the blob multiplier. In one illustrative example, the second blob multiplier includes the post-filtering blob multiplier Ts used in the post-filtering stage described above. The process 1200 further includes filtering the second blob from the plurality of blobs based on the size of the second blob being less than the second size threshold (e.g., the product of the minimum size threshold and the second blob multiplier).

In some examples, the process 1200 includes determining a height of a second blob. The second blob includes pixels of at least a portion of a second foreground object in the video frame. In such examples, the process 1200 further includes filtering the second blob from the plurality of blobs when the height of the second blob is less than a height threshold. In some examples, the height threshold includes a product of a minimum height threshold value and a height multiplier. In some aspects, the minimum height threshold value is determined based on an aspect ratio of a minimum blob size corresponding to the minimum size threshold value. In one illustrative example, a minimum height threshold tsHeight can be the height of a bounding box of an object having the minimum blob size corresponding to the minimum size threshold tsSize. The height multiplier can be set or defined as described above. In some implementations, the height threshold and height multiplier can be used to filter the second blob when the size of the second blob is smaller than a certain size. For example, the process 1200 can include determining a size of the second blob, determining the size of the second blob is greater than the first size threshold (e.g., the product of the minimum size threshold and the blob multiplier), and determining the size of the second blob is greater than the second size threshold (e.g., the product of the minimum size threshold and the second blob multiplier). As noted previously, the second blob multiplier is larger than the blob multiplier. The process 1200 can also determine a height of the second blob, and determine the height of the second blob is less than the height threshold (e.g., the product of a minimum height threshold and the height multiplier). The process 1200 can then filter the second blob from the plurality of blobs based on the height of the second blob being less than the height threshold.

In some examples, the process 1200 includes determining a height and a width of a second blob. The second blob includes pixels of at least a portion of a second foreground object in the video frame. In such examples, the process 1200 further includes determining the height of the second blob is greater than the height threshold (e.g., a product of a minimum height threshold and a height multiplier), and filtering the second blob from the plurality of blobs when the width of the second blob is greater than a width threshold. In some examples, the width threshold includes a product of a maximum width threshold value and a width multiplier. In some aspects, the minimum height threshold value and the maximum width threshold value are determined based on an aspect ratio of a minimum blob size corresponding to the minimum size threshold. In one illustrative example, a maximum width threshold tsWidth can be the width of a bounding box of an object having the minimum blob size corresponding to the minimum size threshold tsSize. The width multiplier can be set or defined as described above. In some implementations, the width threshold and width multiplier can be used to filter the second blob when the size of the second blob is smaller than a certain size and the height of the second blob is smaller than a certain height. For example, the process 1200 can include determining a size of the second blob, determining the size of the second blob is greater than the size threshold (e.g., the product of the minimum size threshold value and the blob multiplier), and determining the size of the second blob is greater than the second size threshold (e.g., the product of the minimum size threshold value and the second blob multiplier). As noted previously, the second blob multiplier is larger than the blob multiplier. The process 1200 can also determine a height and a width of the second blob, determine the height of the second blob is greater than the height threshold (e.g., the product of the minimum height threshold value and the height multiplier), and determine the width of the second blob is greater than the width threshold (e.g., the product of a maximum width threshold value and the width multiplier). The process 1200 can then filter the second blob from the plurality of blobs based on the width of the second blob being greater than the width threshold.

As described above, two or more blobs can be merged together between the pre-filtering and the post-filtering stages. In some examples, a merged blob can be filtered based on its height. For example, the process 1200 includes generating a merged blob. The merged blob is generated by merging a second blob with a third blob. The second blob includes pixels of at least a portion of a second foreground object in the video frame. The third blob can include pixels of the second foreground object or a third foreground object. The process 1200 further includes determining a height of the merged blob, and filtering the merged blob from the plurality of blobs when the height of the merged blob is less than the height threshold. As described previously, the height threshold can, in some examples, include a product of a minimum height threshold and a height multiplier.

In some examples, a merged blob can be filtered based on its width. For example, the process 1200 includes generating a merged blob. The merged blob is generated by merging a second blob with a third blob. The second blob includes pixels of at least a portion of a second foreground object in the video frame. The third blob can include pixels of the second foreground object or a third foreground object. The process 1200 further includes determining a height and a width of the merged blob, and determining the height of the merged blob is greater than the height threshold (e.g., a product of a minimum height threshold and a height multiplier). The process 1200 further includes filtering the merged blob from the plurality of blobs when the width of the merged blob is greater than the width threshold. As described previously, the width threshold can, in some examples, include a product of a maximum width threshold and a width multiplier.

In some examples, the process 1200 can take into account the size of the merged blob, as well as the height and width of the merged blob. For example, the process 1200 can include determining a size of a second blob is greater than the size threshold, which can include, in some examples, the product of the minimum size threshold value and the blob multiplier. The second blob includes pixels of at least a portion of a second foreground object in the video frame. The process 1200 can generate a merged blob including the second blob merged with a third blob. The third blob can include pixels of the second foreground object or a third foreground object. A size of the third blob is greater than the size threshold (e.g., the product of the minimum size threshold value and the blob multiplier). The process 1200 can determine the size of the merged blob is greater than the second size threshold, which can include, in some examples, the product of the minimum size threshold value and a second blob multiplier. The second blob multiplier is larger than the blob multiplier. The process 1200 can then determine a height and a width of the merged blob, and determine the height of the merged blob is greater than the height threshold, which can include, in some examples, a product of a minimum height threshold value and a height multiplier. The process 1200 can determine the width of the merged blob is greater than the width threshold, which can include, in some examples, a product of a maximum width threshold value and a width multiplier, and can filter the merged blob from the plurality of blobs based on the width of the merged blob being greater than the width threshold.

In some examples, the process 1200 may be performed by a computing device or an apparatus, such as the video analytics system 100. For example, the process 1200 can be performed by the blob detection engine 104 shown in FIG. 1, the blob processing engine 318 shown in FIG. 3, and/or the blob processing engine 718 shown in FIG. 7. In some cases, the computing device or apparatus may include a processor, microprocessor, microcomputer, or other component of a device that is configured to carry out the steps of process 1200. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1200 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The content-adaptive filtering operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A computer-implemented method for tracking objects determined to be in one or more video frames, the method comprising:
   generating, by a video analytics system, a plurality of blobs for a video frame from the one or more video frames, the plurality of blobs including pixels representing a plurality of objects in the video frame, wherein the plurality of objects include a foreground object and a background object, wherein the video analytics system generates a first blob for the background object due to detecting a change in pixels associated with the background object;
   determining a number of the plurality of blobs generated for the video frame;
   determining a size of a smallest blob generated for the video frame;
   determining a size threshold based on the number of the plurality of blobs and the size of the smallest blob;
   determining that the first blob is less than the size threshold;
   filtering, based on the first blob being less than the size threshold, the first blob from the plurality of blobs, wherein filtering the first blob removes the first blob from the plurality of blobs; and
   tracking the plurality of blobs that remain after filtering.

2. The computer-implemented method of claim 1, further comprising:
   determining a height of a second blob, wherein the second blob includes pixels of at least a portion of a second object in the video frame; and
   filtering the second blob from the plurality of blobs when the height of the second blob is less than a height threshold.

3. The computer-implemented method of claim 2, wherein the height threshold includes a product of a minimum height threshold value and a height multiplier.

4. The computer-implemented method of claim 3, wherein the minimum height threshold value is determined based on an aspect ratio of a minimum blob size corresponding to a minimum size threshold value.

5. The computer-implemented method of claim 1, further comprising:
   determining a height and a width of a second blob, wherein the second blob includes pixels of at least a portion of a second object in the video frame;
   determining the height of the second blob is greater than a height threshold; and
   filtering the second blob from the plurality of blobs when the width of the second blob is greater than a width threshold.

6. The computer-implemented method of claim 5, wherein the height threshold includes a product of a minimum height threshold value and a height multiplier, and wherein the width threshold includes a product of a maximum width threshold value and a width multiplier.

7. The computer-implemented method of claim 6, wherein the minimum height threshold value and the maximum width threshold value are determined based on an aspect ratio of a minimum blob size corresponding to a minimum size threshold value.

8. The computer-implemented method of claim 1, further comprising:
   generating a merged blob, wherein the merged blob is generated by merging a second blob with a third blob;
   determining a height of the merged blob; and
   filtering the merged blob from the plurality of blobs when the height of the merged blob is less than a height threshold.

9. The computer-implemented method of claim 8, wherein the height threshold includes a product of a minimum height threshold and a height multiplier.

10. The computer-implemented method of claim 1, further comprising:
    generating a merged blob, wherein the merged blob is generated by merging a second blob with a third blob;
    determining a height and a width of the merged blob;
    determining the height of the merged blob is greater than a height threshold; and
    filtering the merged blob from the plurality of blobs when the width of the merged blob is greater than a width threshold.

11. The computer-implemented method of claim 10, wherein the height threshold includes a product of a minimum height threshold value and a height multiplier, and wherein the width threshold includes a product of a product of a maximum width threshold value and a width multiplier.

12. The computer-implemented method of claim 1, wherein the size threshold is determined based on a product of a minimum size threshold value and a blob multiplier, and wherein the blob multiplier is based on the number of the plurality of blobs generated for the video frame.

13. The computer-implemented method of claim 12, wherein the minimum size threshold value defines a minimum blob size for the video frame.

14. The computer-implemented method of claim 12, wherein the blob multiplier is assigned a value according to the number of the plurality of blobs, the value including a minimum multiplier value, a maximum multiplier value, or a value between the minimum multiplier value and the maximum multiplier value.

15. The computer-implemented method of claim 14, wherein the blob multiplier is assigned the minimum multiplier value when the number of the plurality of blobs is below a minimum threshold number of blobs.

16. The computer-implemented method of claim 14, wherein the blob multiplier is assigned the maximum multiplier value when the number of the plurality of blobs is above a maximum threshold number of blobs.

17. The computer-implemented method of claim 14, wherein the blob multiplier is assigned the value between the minimum multiplier value and the maximum multiplier value when the number of the plurality of blobs is between a minimum threshold number of blobs and a maximum threshold number of blobs.

18. An apparatus comprising:
a memory configured to store video data; and
a processor configured to:
generate a plurality of blobs for a video frame from one or more video frames, the plurality of blobs including pixels representing a plurality of objects in the video frame, wherein the plurality of objects include a foreground object and a background object, wherein the processor generates a first blob for the background object due to detecting a change in pixels associated with the background object;
determine a number of the plurality of blobs-generated for the video frame;
determine a size of a smallest blob generated for the video frame;
determine a size threshold based on the number of the plurality of blobs and the size of the smallest blob;
determine that a size of the first blob is less than the size threshold;
filter, based on the first blob being less than the size threshold, the first blob from the plurality of blobs; and
track the plurality of blobs that remain after filtering.

19. The apparatus of claim 18, wherein the processor is further configured to:
determine a height of a second blob, wherein the second blob includes pixels of at least a portion of a second object in the video frame; and
filter the second blob from the plurality of blobs when the height of the second blob is less than a height threshold.

20. The apparatus of claim 19, wherein the height threshold includes a product of a minimum height threshold value and a height multiplier.

21. The apparatus of claim 20, wherein the minimum height threshold value is determined based on an aspect ratio of a minimum blob size corresponding to a minimum size threshold value.

22. The apparatus of claim 18, wherein the processor is further configured to:
determine a height and a width of a second blob, wherein the second blob includes pixels of at least a portion of a second object in the video frame;
determine the height of the second blob is greater than a height threshold; and
filter the second blob from the plurality of blobs when the width of the second blob is greater than a width threshold.

23. The apparatus of claim 22, wherein the height threshold includes a product of a minimum height threshold value and a height multiplier, and wherein the width threshold includes a product of a maximum width threshold value and a width multiplier.

24. The apparatus of claim 23, wherein the minimum height threshold value and the maximum width threshold value are determined based on an aspect ratio of a minimum blob size corresponding to a minimum size threshold value.

25. The apparatus of claim 18, wherein the size threshold is determined based on a product of a minimum size threshold value and a blob multiplier, and wherein the blob multiplier is based on the number of the plurality of blobs generated for the video frame.

26. The apparatus of claim 25, wherein the blob multiplier is assigned a value according to the number of the plurality of blobs, the value including a minimum multiplier value, a maximum multiplier value, or a value between the minimum multiplier value and the maximum multiplier value.

27. A non-transitory computer readable medium having stored thereon instructions that when executed by a processor perform a method, including:
generating a plurality of blobs for a video frame from one or more video frames, the plurality of blobs including pixels representing a plurality of objects in the video frame, wherein the plurality of objects include a foreground object and a background object, wherein the instructions cause the processor to generate a first blob for the background object due to detecting a change in pixels associated with the background object;
determining a number of the plurality of blobs generated for the video frame;
determining a size of a smallest blob generated for the video frame;
determining a size threshold based on the number of the plurality of blobs and the size of the smallest blob;
determining that the first blob is less than the size threshold;
filtering, based on the first blob being less than the size threshold, the first blob from the plurality of blobs, wherein filtering the first blob removes the first blob from the plurality of blobs; and
tracking the plurality of blobs that remain after filtering.

28. The non-transitory computer readable medium of claim 27, further comprising:
determining a height of a second blob, wherein the second blob includes pixels of at least a portion of a second object in the video frame; and
filtering the second blob from the plurality of blobs when the height of the second blob is less than a height threshold.

29. The non-transitory computer readable medium of claim 27, further comprising:
determining a height and a width of a second blob, wherein the second blob includes pixels of at least a portion of a second object in the video frame;
determining the height of the second blob is greater than a height threshold; and
filtering the second blob from the plurality of blobs when the width of the second blob is greater than a width threshold.

30. The non-transitory computer readable medium of claim 27, wherein the size threshold is determined based on a product of a minimum size threshold value and a blob multiplier, and wherein the blob multiplier is based on the number of the plurality of blobs generated for the video frame.

* * * * *